(12) United States Patent
Shapiro et al.

(10) Patent No.: US 7,908,203 B2
(45) Date of Patent: Mar. 15, 2011

(54) COORDINATION OF ALGORITHMS IN ALGORITHMIC TRADING ENGINE

(75) Inventors: Andrew Shapiro, Brooklyn, NY (US);
Abe Burmeister, Brooklyn, NY (US);
Ian Dempsey, New York, NY (US);
Brent Gamse, Delray Beach, FL (US);
Henri Waelbroeck, Scarsdale, NY (US)

(73) Assignee: Pipeline Financial Group, Inc., New York, NY (US)

( * ) Notice: Subject to any disclaimer, the term of this patent is extended or adjusted under 35 U.S.C. 154(b) by 353 days.

(21) Appl. No.: 11/783,250

(22) Filed: Apr. 6, 2007

(65) Prior Publication Data

US 2008/0040254 A1 Feb. 14, 2008

Related U.S. Application Data

(60) Provisional application No. 60/795,646, filed on Apr. 28, 2006.

(51) Int. Cl.
*G06Q 40/00* (2006.01)
(52) U.S. Cl. ............................................. 705/37; 705/38
(58) Field of Classification Search ................ 705/35–38
See application file for complete search history.

(56) References Cited

U.S. PATENT DOCUMENTS

| | | | |
|---|---|---|---|
| 5,136,501 A | 8/1992 | Silverman et al. | |
| 5,689,652 A | 11/1997 | Lupien et al. | |
| 5,717,989 A | 2/1998 | Tozzoli et al. | |
| 5,724,524 A | 3/1998 | Hunt et al. | |
| 5,724,525 A | 3/1998 | Beyers, II et al. | |
| 5,794,207 A | 8/1998 | Walker et al. | |
| 5,842,178 A | 11/1998 | Giovannoli | |
| 5,845,266 A | 12/1998 | Lupien et al. | |
| 5,873,071 A | 2/1999 | Ferstenberg et al. | |
| 5,924,082 A | 7/1999 | Silverman et al. | |
| 5,950,177 A | 9/1999 | Lupien et al. | |
| 6,236,979 B1 | 5/2001 | Kawabata et al. | |
| 6,260,025 B1 | 7/2001 | Silverman et al. | |
| 6,285,983 B1 | 9/2001 | Jenkins | |
| 6,285,984 B1 | 9/2001 | Speicher | |
| 6,304,858 B1 | 10/2001 | Mosler et al. | |
| 6,317,728 B1 | 11/2001 | Kane | |

(Continued)

FOREIGN PATENT DOCUMENTS

GB 2417576 A 1/2006

(Continued)

OTHER PUBLICATIONS

J.D. Farmer and N. Zamani; "Mechanical vs. Informational Components of Price Impact" 2006; http://www.santafe.edu/research/publications/workingpapers/06-09-034.pdf; pp. 1-19.

(Continued)

*Primary Examiner* — Thu Thao Havan
(74) *Attorney, Agent, or Firm* — Cowan, Liebowitz & Latman; Steven D. Underwood

(57) ABSTRACT

A graphical user interface is used along with an automated algorithm selection function to enable market participants to initiate automated, multi-algorithm trading strategies through a single drag and drop motion. A symbol representing a security can be dragged and dropped onto an icon representing a tactical or strategic algorithm. Other features of the graphical user interface show information such as the progress of the algorithms.

14 Claims, 35 Drawing Sheets

Active Benchmark Dial below fishbone in Strategy Process area with numeric indicators labeled

U.S. PATENT DOCUMENTS

| | | |
|---|---|---|
| 6,321,212 B1 | 11/2001 | Lange |
| 6,408,282 B1 | 6/2002 | Buist |
| 6,421,653 B1 | 7/2002 | May |
| 6,578,014 B1 | 6/2003 | Murcko, Jr. |
| 6,594,643 B1 | 7/2003 | Freeny, Jr. |
| 6,766,304 B2 | 7/2004 | Kemp |
| 6,772,132 B1 | 8/2004 | Kemp |
| 6,938,011 B1 | 8/2005 | Kemp |
| 6,985,883 B1 | 1/2006 | Togher et al. |
| 7,003,486 B1 | 2/2006 | Condamoor et al. |
| 7,035,819 B1 | 4/2006 | Gianakouros et al. |
| 7,130,823 B1 | 10/2006 | Rayner et al. |
| 7,136,834 B1 | 11/2006 | Merrin et al. |
| 7,162,447 B1 | 1/2007 | Cushing |
| 2002/0026404 A1 | 2/2002 | Thompson |
| 2002/0035534 A1 | 3/2002 | Buist et al. |
| 2002/0046146 A1 | 4/2002 | Otero |
| 2002/0046149 A1 | 4/2002 | Otero |
| 2002/0046151 A1 | 4/2002 | Otero et al. |
| 2002/0049661 A1 | 4/2002 | Otero |
| 2002/0082967 A1 | 6/2002 | Kaminsky et al. |
| 2002/0133449 A1 | 9/2002 | Segal et al. |
| 2003/0004859 A1 | 1/2003 | Shaw et al. |
| 2003/0009411 A1 | 1/2003 | Ram |
| 2003/0093343 A1 | 5/2003 | Huttenlocher et al. |
| 2003/0167224 A1 | 9/2003 | Periwal |
| 2004/0177024 A1 | 9/2004 | Bok et al. |
| 2004/0193524 A1 | 9/2004 | Almeida |
| 2004/0210511 A1 | 10/2004 | Waelbroeck et al. |
| 2004/0236669 A1 | 11/2004 | Horst et al. |
| 2005/0004852 A1 | 1/2005 | Whitney |
| 2005/0075963 A1 | 4/2005 | Balabon |
| 2006/0020538 A1 | 1/2006 | Ram et al. |
| 2006/0080215 A1 | 4/2006 | Warsaw et al. |
| 2006/0080219 A1 | 4/2006 | Lutnick et al. |
| 2006/0259394 A1* | 11/2006 | Cushing et al. ............... 705/37 |
| 2007/0038549 A1 | 2/2007 | Janowski et al. |
| 2009/0119224 A1* | 5/2009 | Petrino ............... 705/36 R |
| 2010/0030720 A1 | 2/2010 | Stephens |

FOREIGN PATENT DOCUMENTS

| | | |
|---|---|---|
| KR | 2002-0014286 | 2/2002 |
| KR | 2005-0001121 | 1/2005 |
| WO | WO-00/77670 | 12/2000 |
| WO | 01/61579 A1 | 8/2001 |

OTHER PUBLICATIONS

Madden, Bartley J., "Structural Changes in Trading Stocks," The Journal of Portfolio Management, Fall 1993, pp. 19-27.

Domowitz, I., "A Taxonomy of Automated Trade Execution Systems," Journal of International Money and Finance of Butterworth Scientific, Guilford, GB, vol. 12, 1993, pp. 607-632.

Hendershott, T., "Electronic Trading in Financial Markets," IT Pro, Jul./Aug. 2003, pp. 10-14.

International Preliminary Report on Patentability mailed Oct. 28, 2008, in International Application No. PCT/US2007/067528.

U.S. Appl. No. 09/504,939, filed Feb. 16, 2000, which is the parent to Publication No. US 2010-0030720 A1 published Feb. 4, 2010.

A Paper presented in Maastricht NL Aug. 2004: Harald A. Benik et al. "A Study of Neo-Austrian Economics using an Artificial Stock Market" pp. 1-41.

Artificial Life, vol. 4, No. 2, pp. 183-201: Christopher R. Stephens et al. "Self-Adaptation in Evolving Systems" (Spring 1998).

Jose L. Gordillo et al. "Analysis of Financial markets with the Artificial Agent-based Model—NNCP" pp. 1-10 (ENC01 (INEGI), pp. 251-263 (2001).

Christopher R. Stephens et al. "Testing Efficiency in a Simulated Market using Excess Returns" pp. 1-17 (publication date unknown).

Handbook of Marketing Research—Uses, Misuses, and Future Advances, eds Grover & Vriens (Sage Publications) Christopher R. Stephens et al. "An Introduction to Data Mining" pp. 1-39 (published Jun. 23, 2006).

Genetic Programming and Evolvable Machines, vol. 1, pp. 363-378, Christopher R. Stephens et al. "Effective Fitness as an Alternative Paradigm for Evolutionary Computation I: General Formalism" (Oct. 2001).

Genetic Programming and Evolvable Machines, vol. 2, pp. 7-32, Christopher R. Stephens et al. "Effective Fitness as an Alternative Paradigm for Evolutionary Computation II: Examples and Applications" (Mar. 2001).

* cited by examiner

Figure 1: Watch List
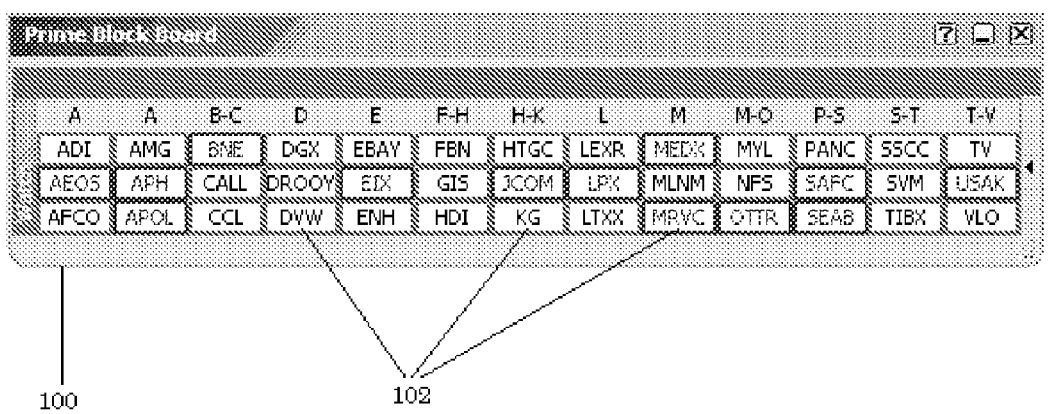

Figure 2: Enlarged Symbol on Watch list
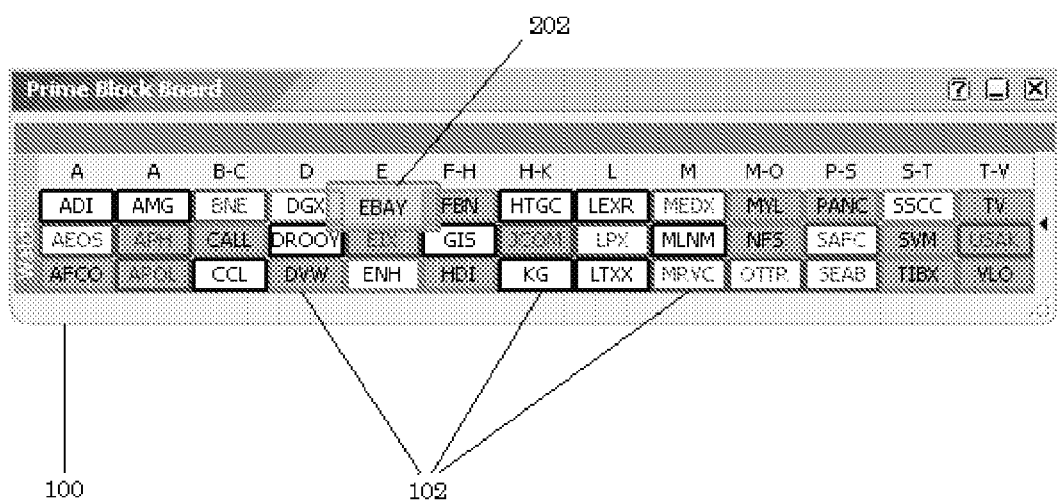

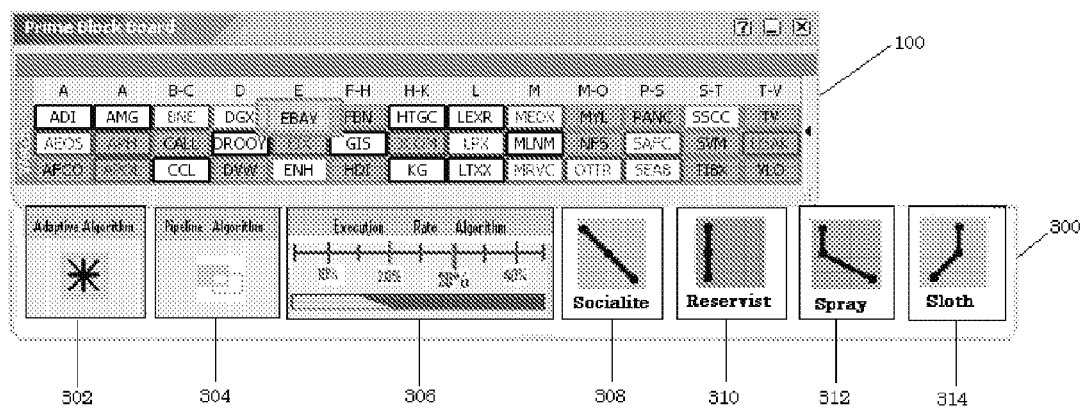
Figure 3: Dashboard

Figure 4: Dashboard with Behavior Matrix and display of execution rates for selected tactical algorithm
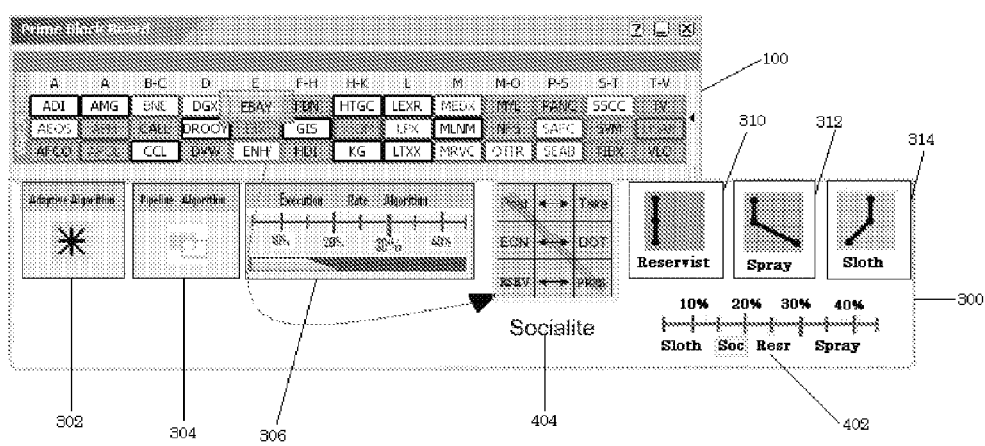

Figure 5: Dashboard with "Fishbone"
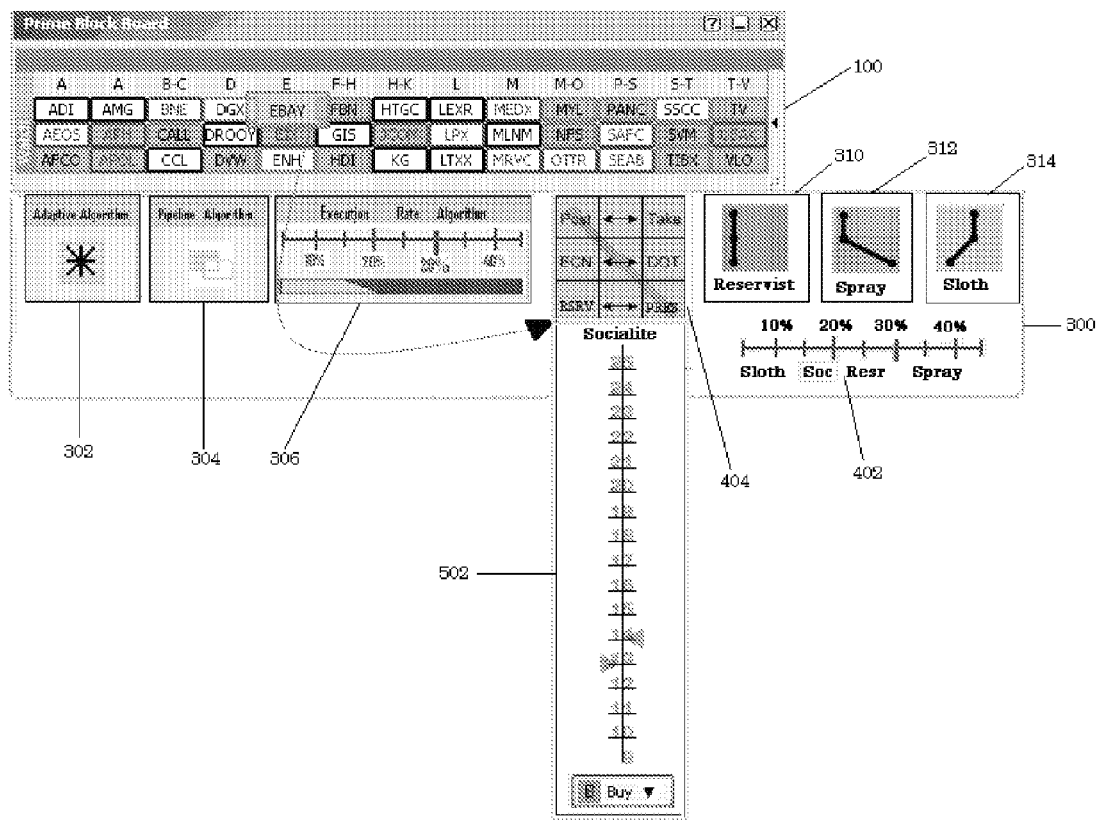

Figure 6: Dropping symbol on desired participation rate to launch Fishbone for Participation Rate Algorithm
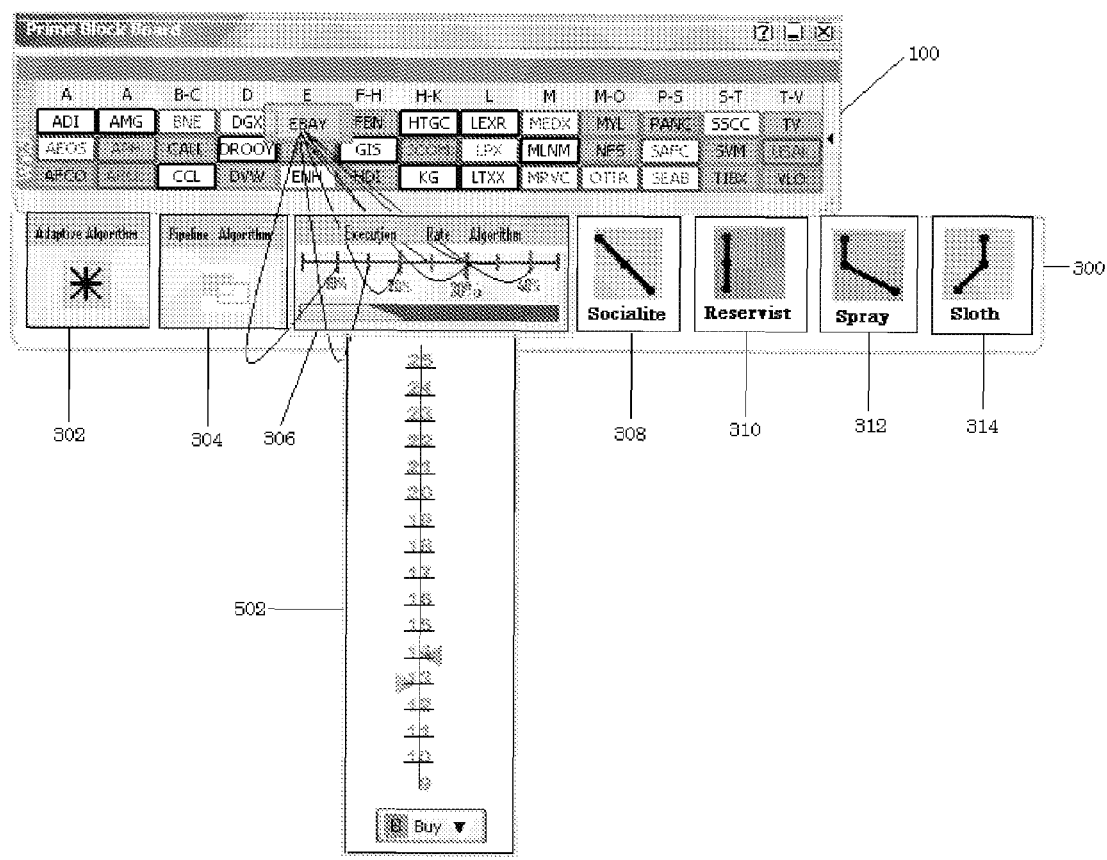

Figure 7: Dropping symbol on Pipeline Algorithm to launch order entry box
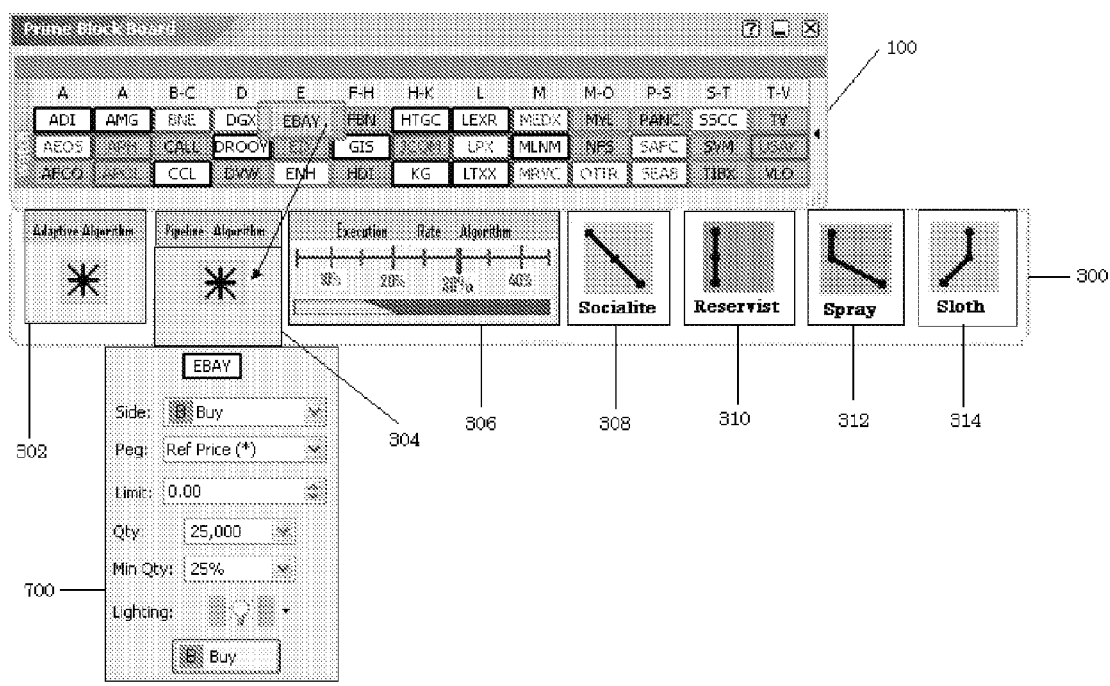

Figure 8: Positions Window
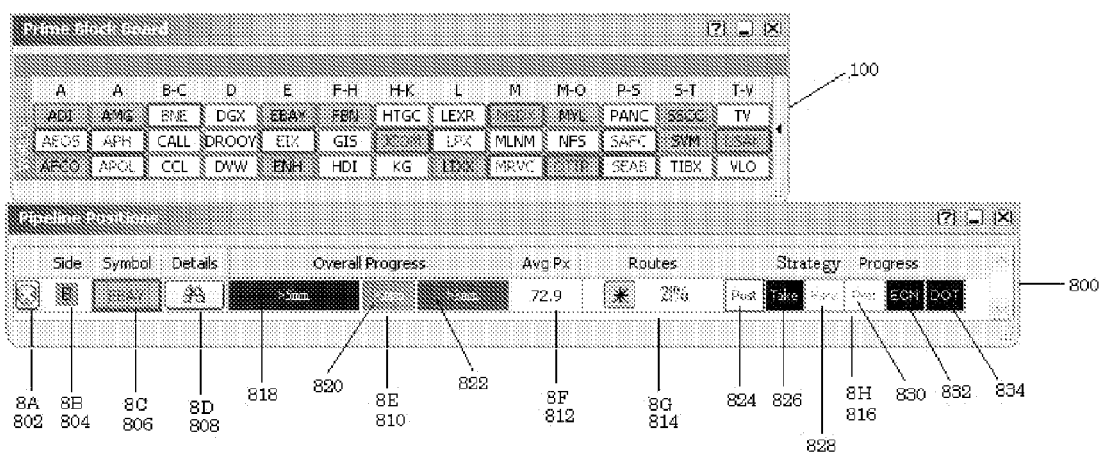

Figure 9: Positions window with "Overall Progress" Information Box
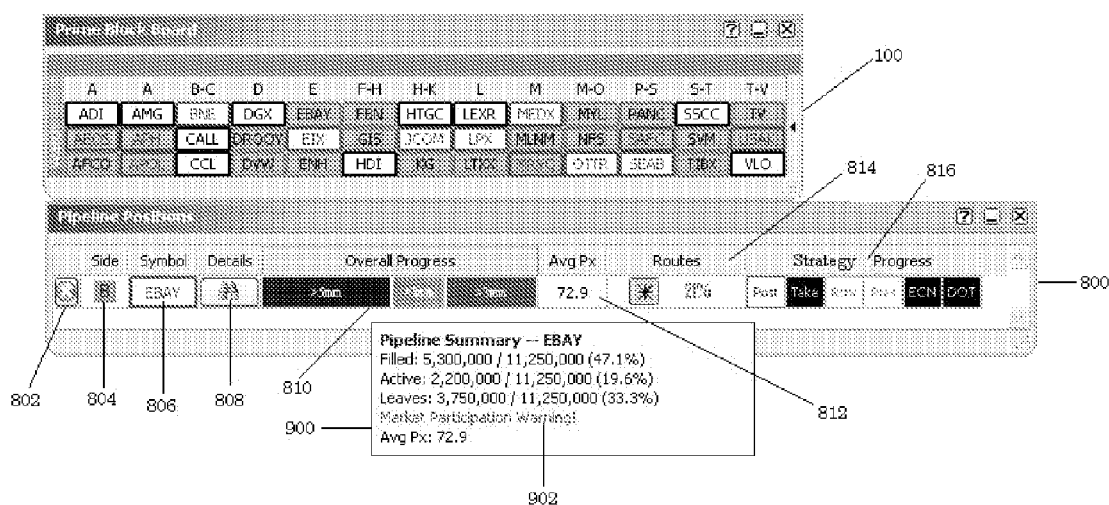

Figure 10: Positions Window with Trade Details Information Box
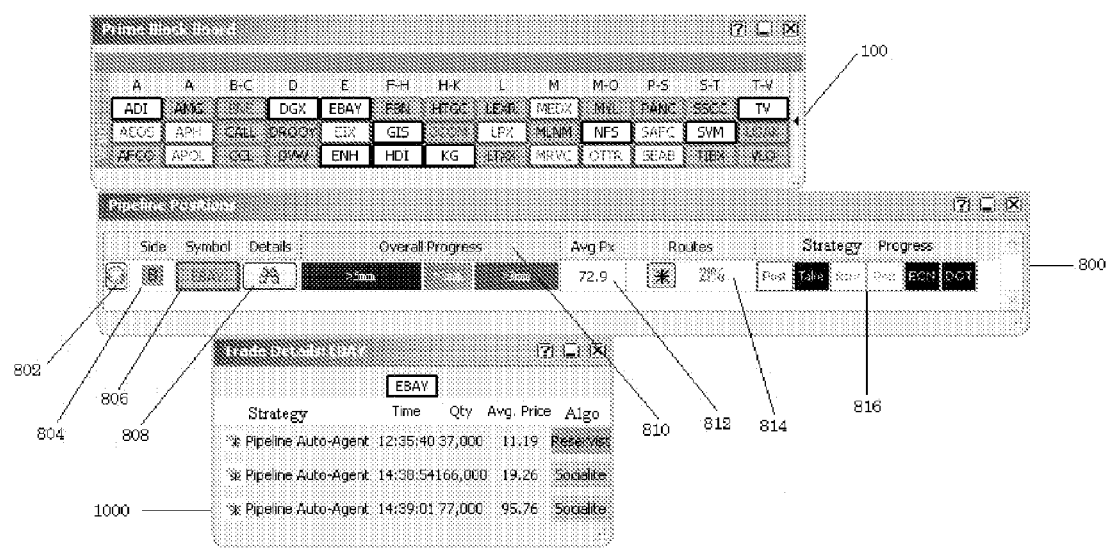

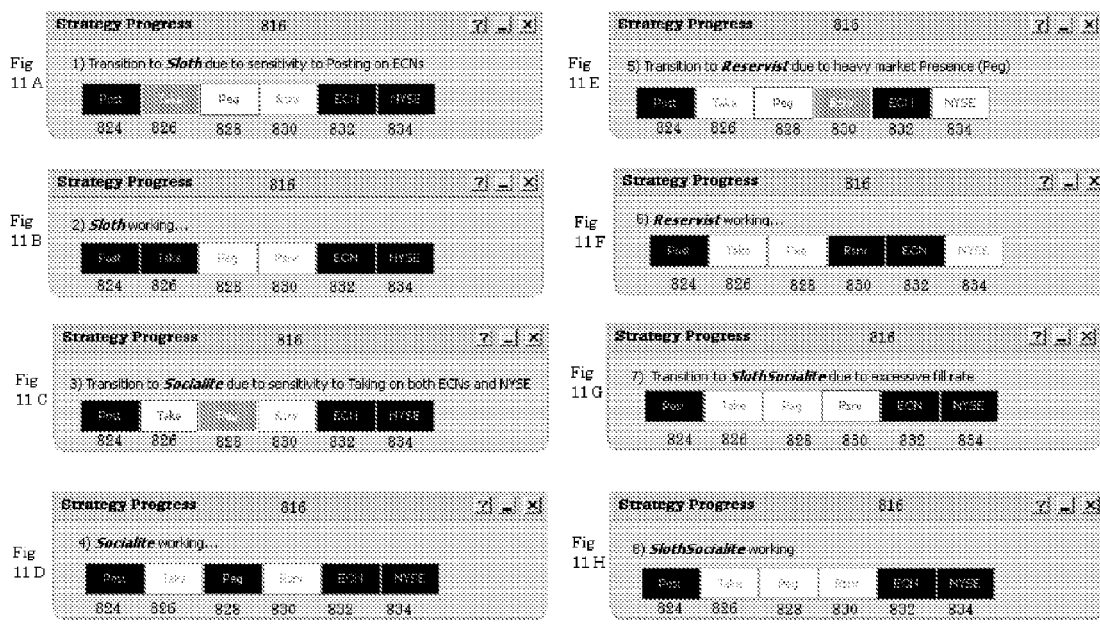
Figure 11: Examples of tactic update messages in Strategy Progress area Figure 12: Positions window with active orders in multiple symbols
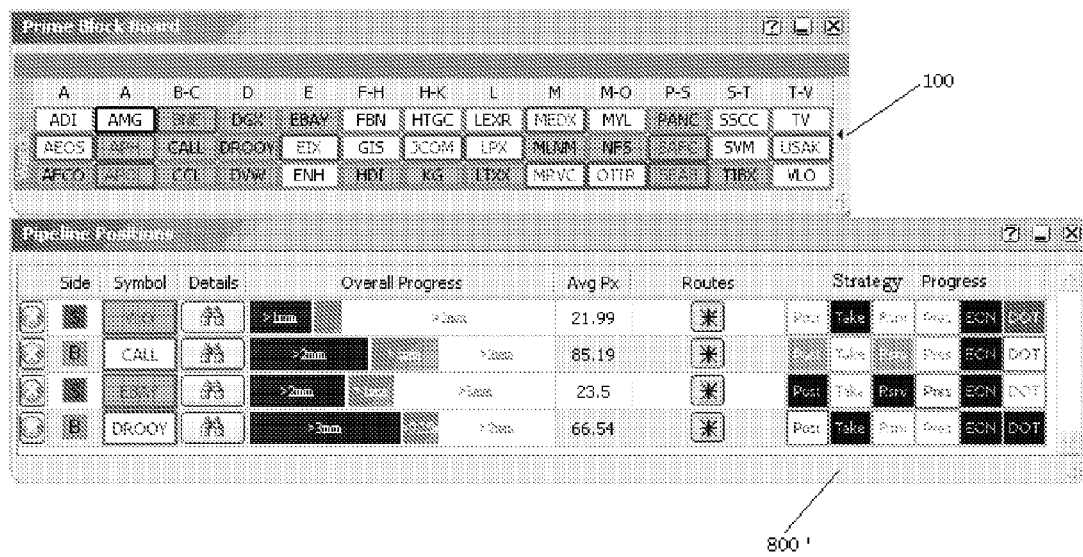

Figure 13: Positions Window for Symbol with multiple active algorithms
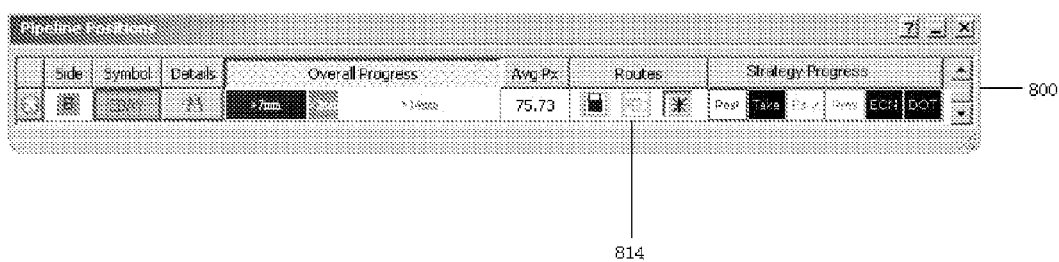

Figure 14: Positions window Toolbar
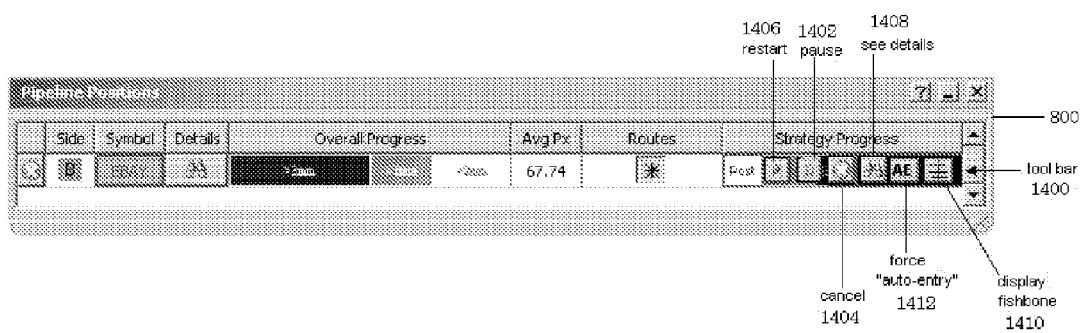

Figure 15: Positions Window Toolbar in Pipeline embodiment
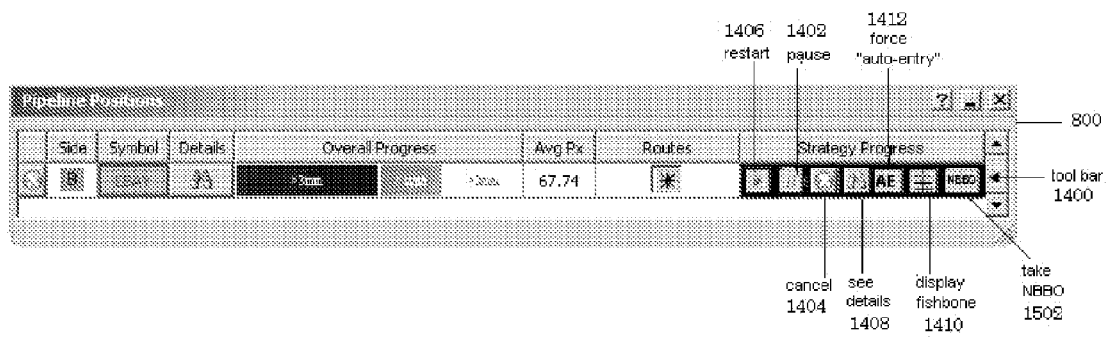

Figure 16: Fishbone for active algorithm launched from Positions window, shows limit price for active algorithm and current bid/offer.
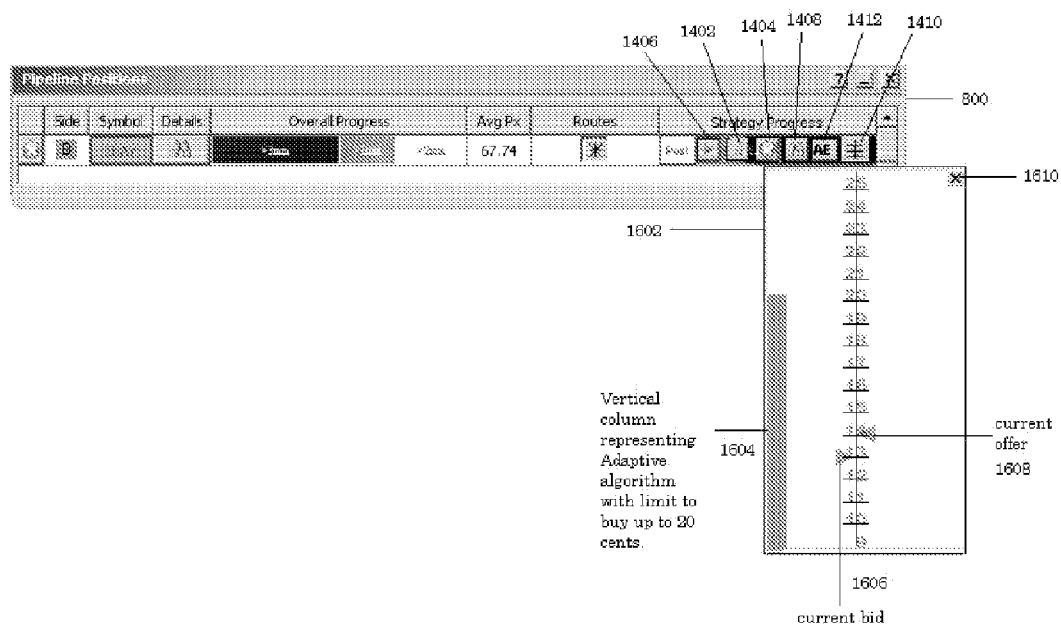

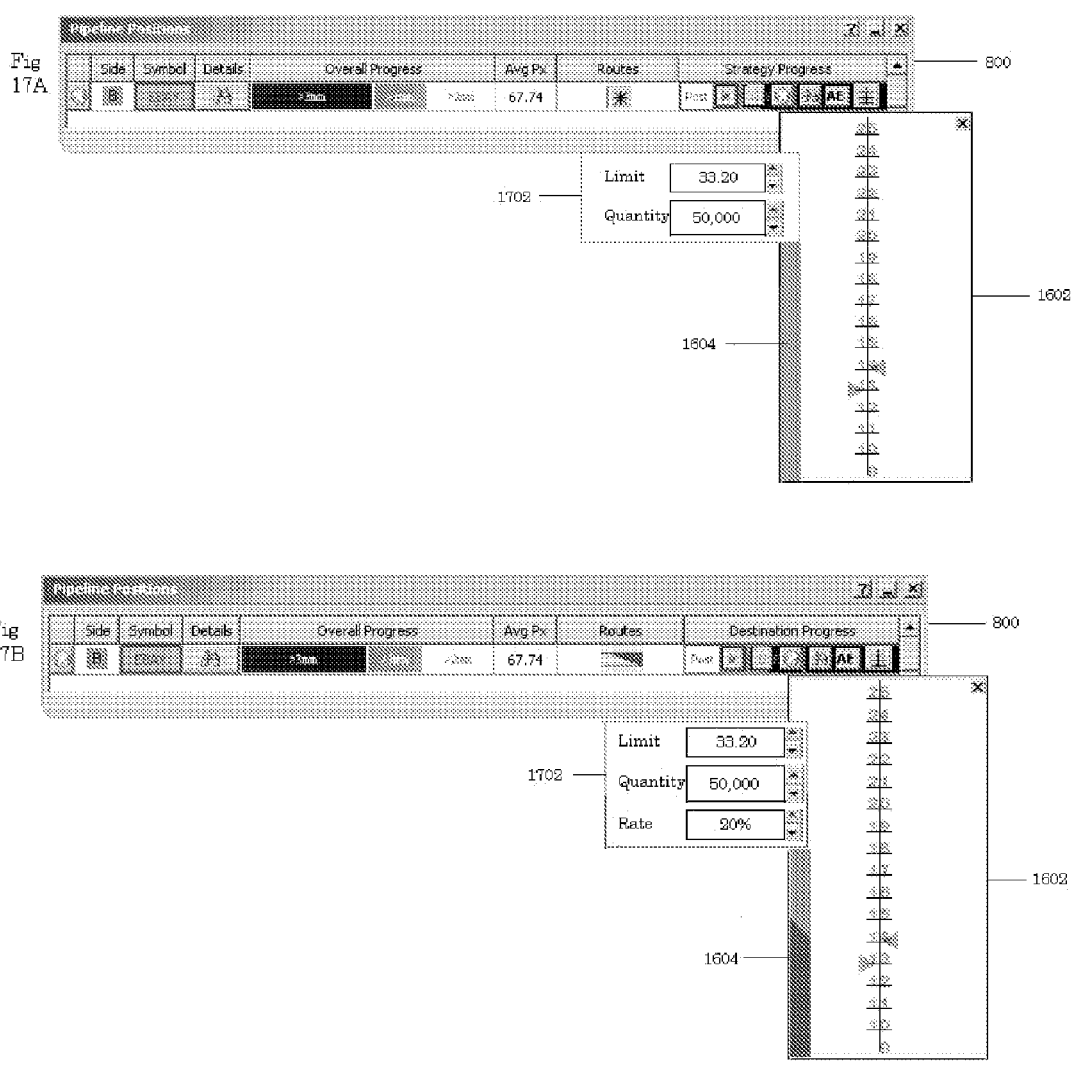
Figure 17: Order box launched from active Fishbone used to alter algorithm's operating parameters Figure 18: Fishbone for active algorithm launched from Positions window toolbar, shows pending and filled orders
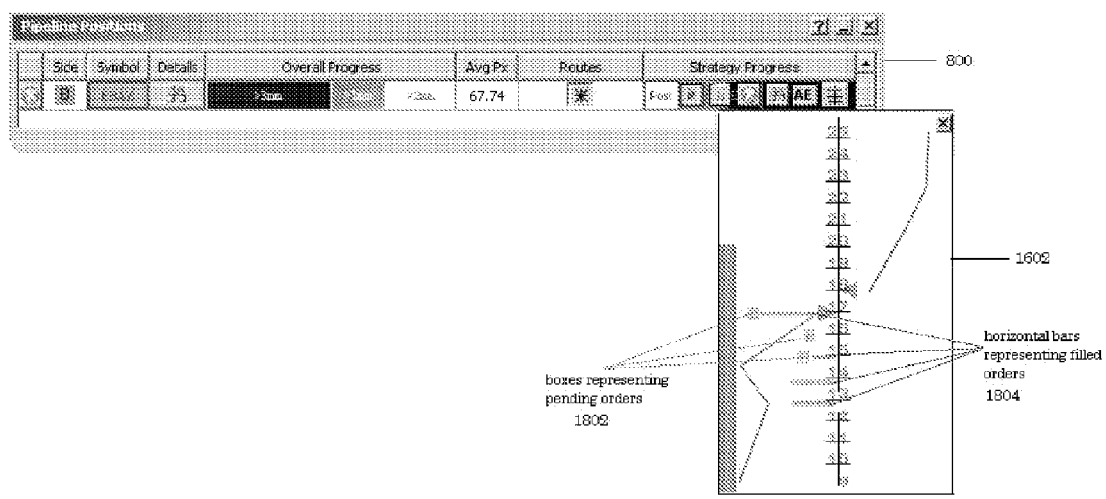

Figure 19: Fishbone for active algorithm launched from Positions window tool bar, shows liquidity lines representing effective depth of book
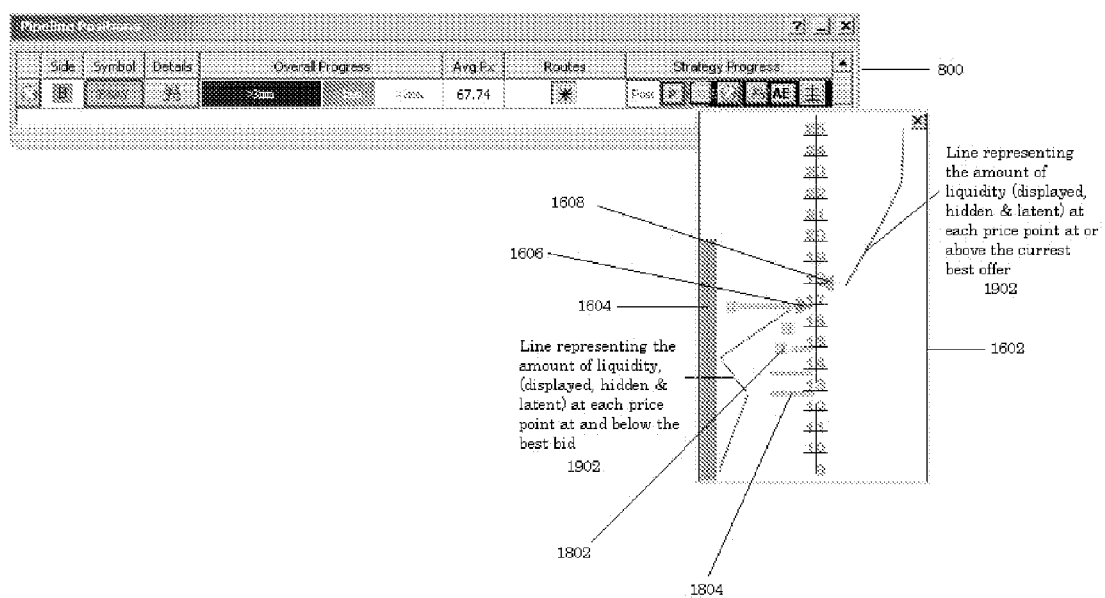

Figure 20: Fishbone in Strategy Progress area with "Display Benchmark Monitor Dial" button
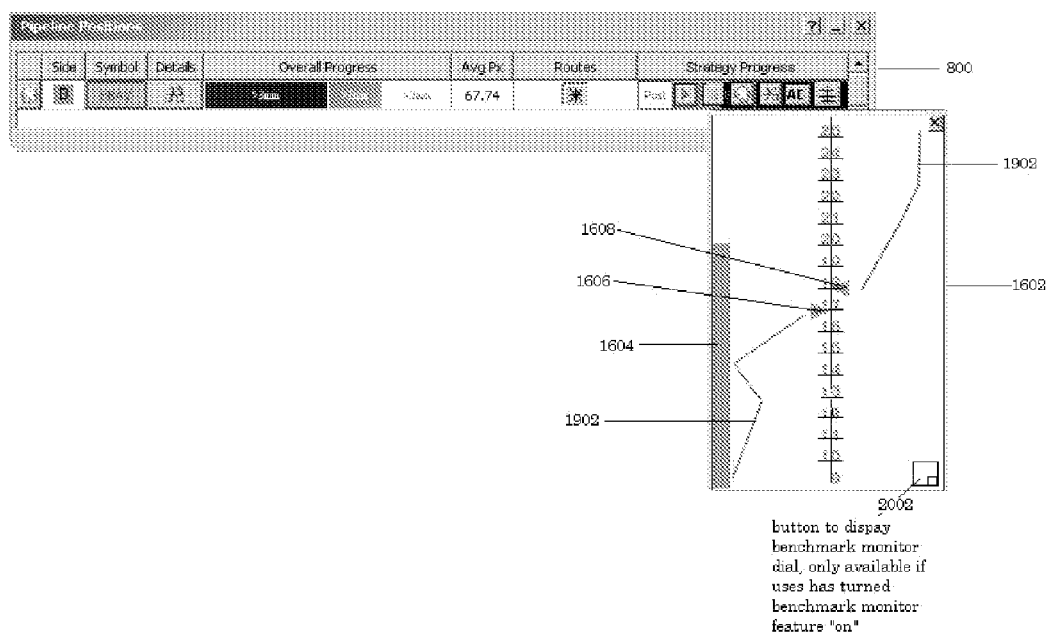

Figure 21: "Inactive" Benchmark Dial below fishbone in Strategy Process area
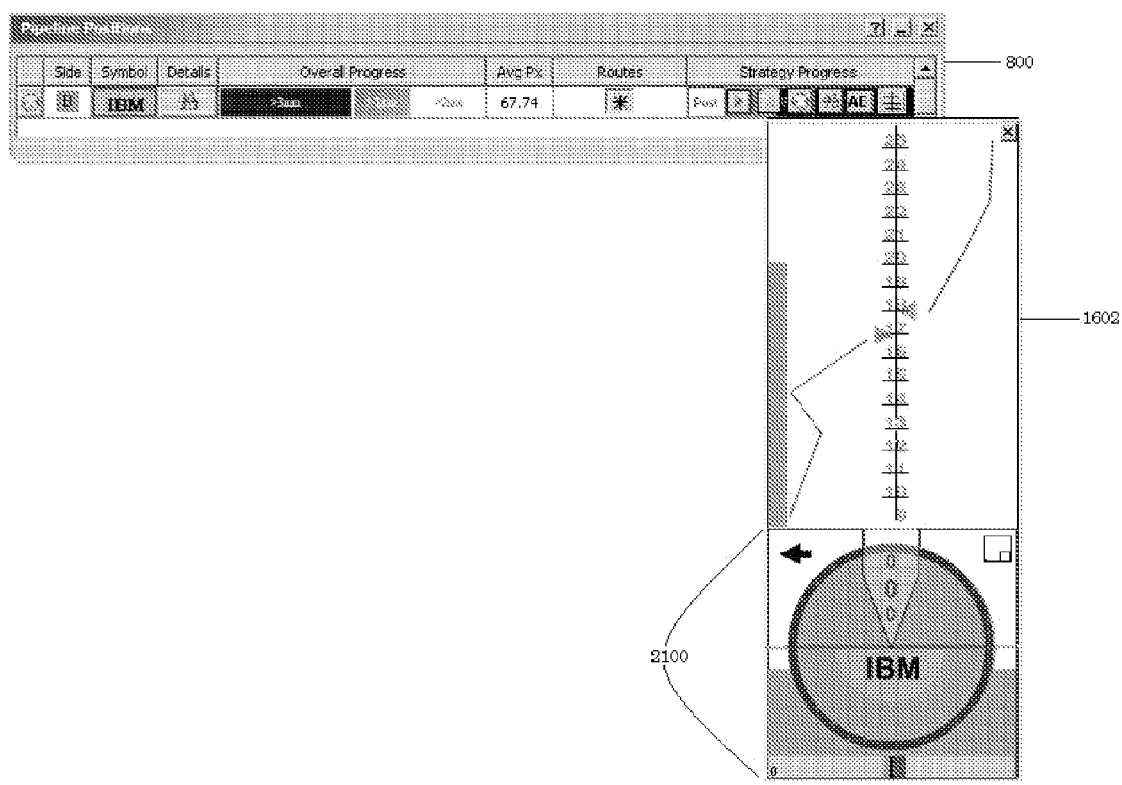

Figure 22: Active Benchmark Dial below fishbone in Strategy Process area with numeric indicators labeled
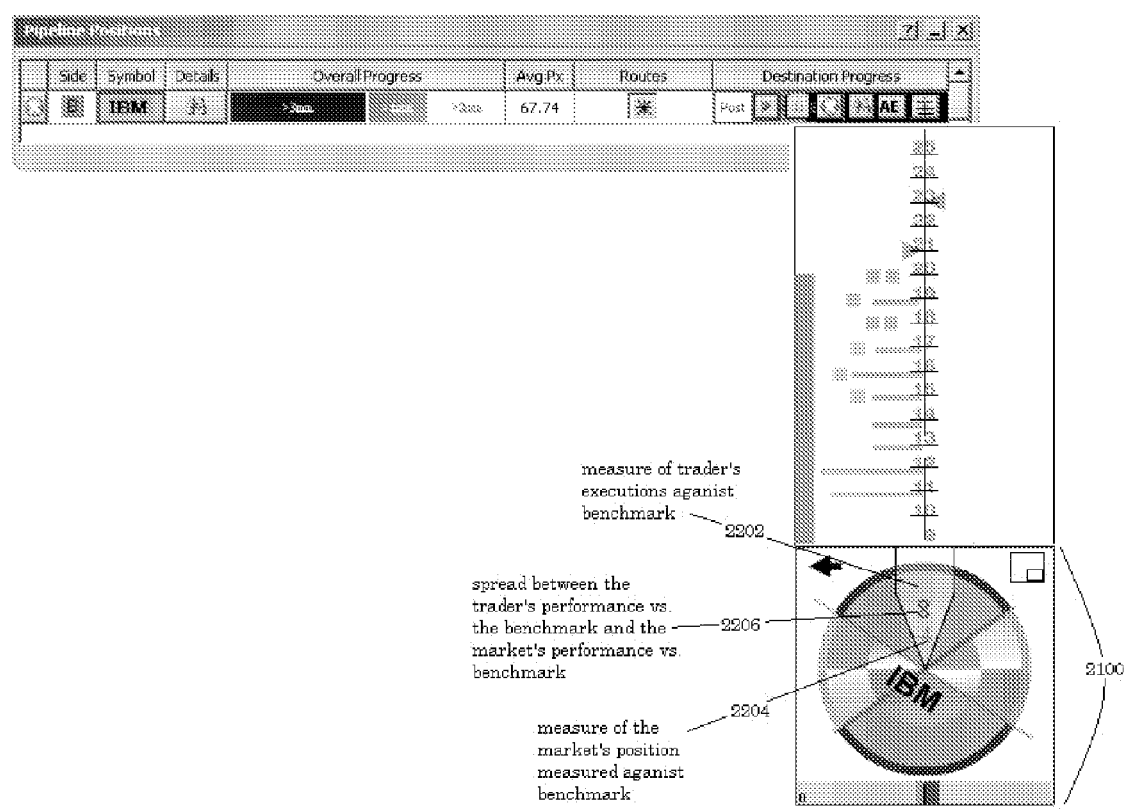

Figure 23: Active Benchmark Dial below fishbone in Strategy Process area with graphic indicators labeled
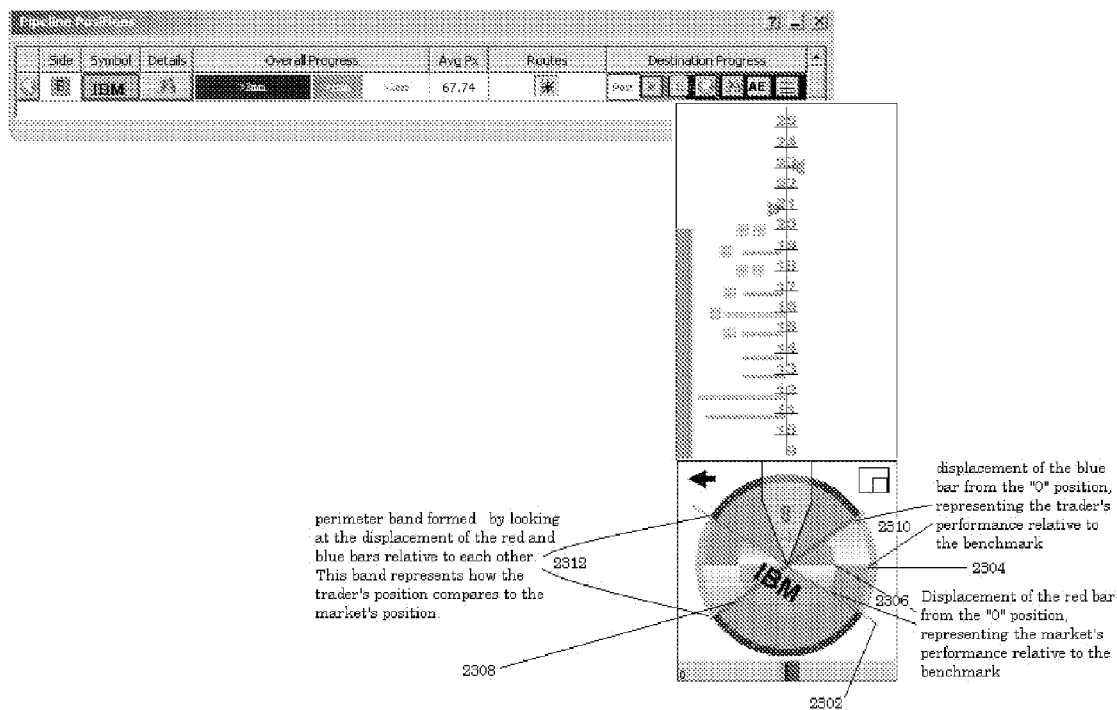

Figure 24: Series of active benchmark dials

Fig 24A 1.
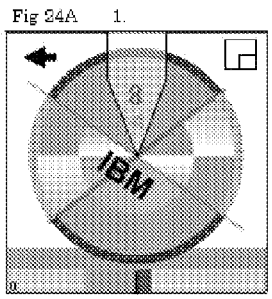

The same dial from Figure 22, the trader is beating VWAP by 4 cents, the market is missing VWAP by 4 cents and as a result the trader is making 8 cents per share.

Fig 24B 2.
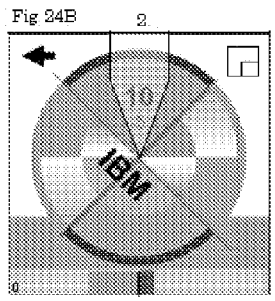

The market has moved further in the trader's favor. Now he is beating VWAP by 5 cents, the market is missing VWAP by 5 cents and the trader is making 10 cents per share. Note that the size of the market representing wedge and the trader representing trapezoid are larger and the red and green shading is darker in both areas.

Fig 24C 3.
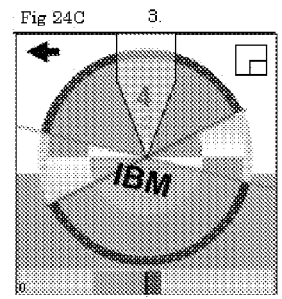

The market has turned, now the trader is only beating VWAP by 3 cents, the market is only missing VWAP by 2 cents and the trader is only making 4 cents per share. Also note the changes in the size and depth of color in the shaded areas.

Fig 24D 4.
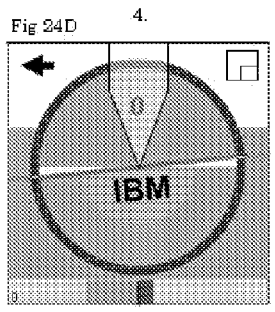

With continued movement, the trader and the market are now even, both beating VWAP by one cent. As a result the trader is now even with the market.

Fig 24E 5.
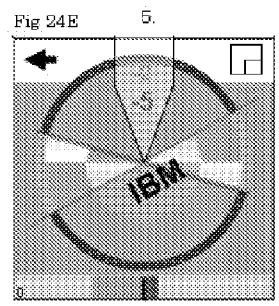

As the market continues to move, the trader is now missing VWAP by 2 cents, while the market is beating VWAP by 3 cents. As a result the trader is now losing 5 cents a share.

Fig 24F 6.
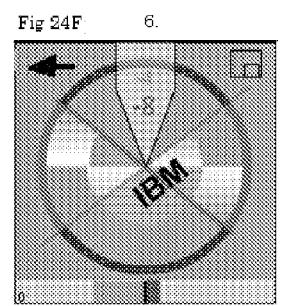

In a total reversal of fortune, the market has moved such that the trader is in the very opposite position from where he started: he is missing VWAP by 4 cents, the market is beating VWAP by 4 cents and he is losing 8 cents per share.

Figure 25: Using the "rotate" arrow to flip from the benchmark dial to the market context Figure 26: Example Market Context, labeled
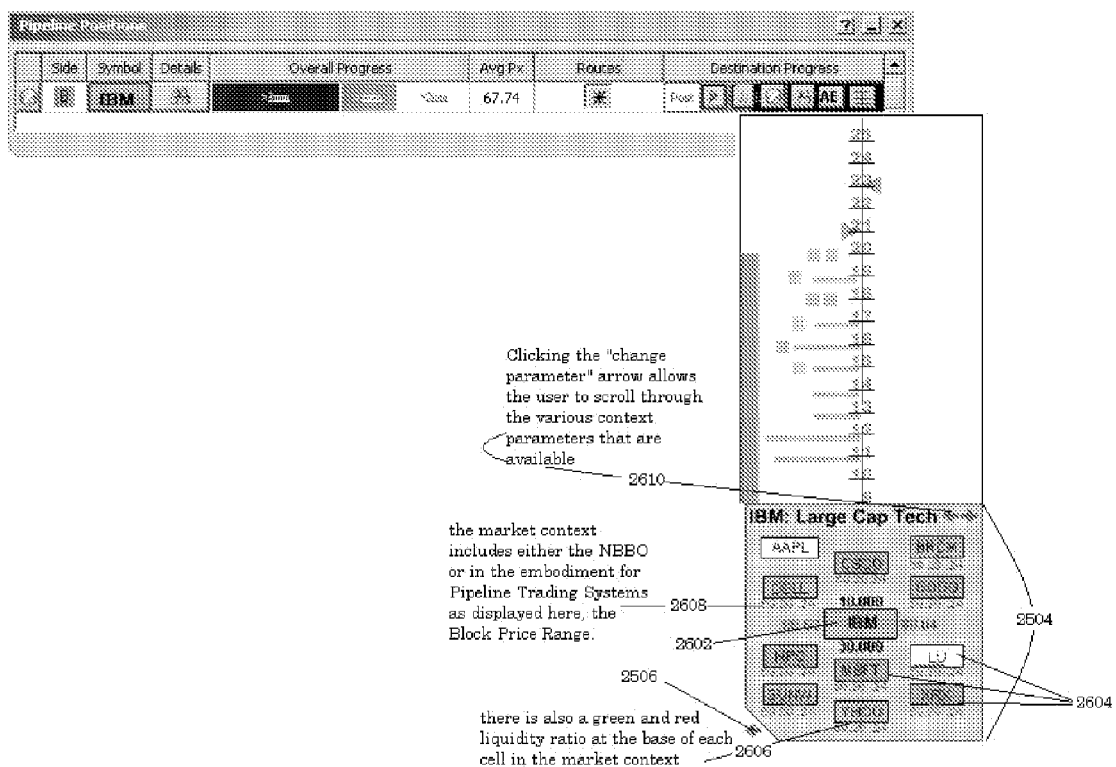

COORDINATION OF ALGORITHMS IN ALGORITHMIC TRADING ENGINE

REFERENCE TO RELATED APPLICATION

The present application claims the benefit of U.S. Provisional Patent Application No. 60/795,646, filed Apr. 28, 2006, whose disclosure is hereby incorporated by reference in its entirety into the present disclosure.

BACKGROUND OF THE INVENTION

1. Field of the Invention

The present invention is directed to algorithmic trading in the financial industry and more particularly to a graphical user interface to allow a user to control such trading.

2. Description of Related Art

In recent years, the combination of decimalization and market fragmentation has triggered a significant rise in algorithmic trading within the financial industry. TowerGroup defines algorithmic trading as, "placing a buy or sell order of a defined quantity into a quantitative model that automatically generates the timing of orders and the size of orders based on goals specified by the parameters and constraints of the model's logic." An increasing number of traders are turning to algorithms as a lower-cost and theoretically more efficient way to cope with the proliferation of liquidity pools, ever-shrinking order sizes, and "penny-jumping.' Celent consulting predicts that the overall trade volume attributed to algorithmic trading will increase from 14% in 2005 to 25% in 2008. Not surprisingly, the increased interest in algorithmic trading has also been accompanied by a dramatic surge in the number of financial firms and third party vendors offering algorithmic trading products. Yet despite this proliferation of algorithmic trading, there are still many traders who are not comfortable with the process of selecting, managing, and evaluating algorithms.

This discomfort with algorithmic trading can be attributed to a number of factors. For one, traders have not been given the level of training or technological support required to maximize the benefits of algorithmic trading. Firms have been selling their algorithms as stand-alone products without providing interactive electronic tools to help traders select, manage, and evaluate the algorithms they have at their disposal. As a result, they often find themselves selecting the wrong algorithm, or if they select the right one, failing to manage it properly once it is active. In fact, traders often claim that the algorithms they use under perform their benchmarks. While it is unclear whether this inadequate performance should be attributed to the algorithms themselves or the traders' inability to use them properly, it is clear that many traders are skeptical about the ability of algorithms to match the execution quality that can be achieved with more conventional methods.

Second, the use of the complex algorithms which require less input and management from users has necessarily implied a loss of control for the trader. In using these complex algorithms, traders have been forced to hand their orders to a "black box," an opaque system that takes inputs and gives outputs without revealing the logic of how it works. While the lack of transparency helps prevent the information leakage that can happen when an algorithm's logic is known or too obvious, it also disintermediates the trader; denying him crucial information about the nature and quality of his executions. As a result, many traders who use these more complex algorithms lose the ability to observe how their orders impact the market. Without these observations, a trader is distanced from "market feel," the very value that he adds as a human trader.

What has been missing from the algorithmic landscape is a system that uses a simple, intuitive interface to enable the automation of complex trading strategies and to provide users with real-time feedback regarding changing market dynamics, market impact and order executions. Existing prior art has attempted to address this need, but has failed; providing only text-heavy user interfaces with information that is hard to understand and even harder to navigate.

SUMMARY OF THE INVENTION

It is therefore an object of the present invention to fill the above-noted void.

It is another object of the invention to use a graphical user interface along with an automated algorithm selection function to enable market participants to initiate automated, multi-algorithm trading strategies through a single drag and drop motion.

It is still another object of the invention to give the trader real-time feedback about both his order executions and the market impact caused by these executions.

Together, the subject system's combination of simplified initiation and real-time feedback offers traders a "user-centric" approach to the automation of complex trading strategies. As such, the subject system enhances rather than supplants the value a human brings to the trading process; expanding rather than limiting his perspective on the market and how his orders impact the market through real-time visual indications of changing market conditions, the tactics his algorithms are using and the level of market impact caused by these tactics.

To achieve the above and other objects, the present invention is directed to a method for improving the process of algorithmic trading by simplifying the tasks of initiating and managing algorithms while providing the user with real-time feedback regarding his automated trade executions. Preferred embodiments of the subject system overcome the limitations of known algorithmic trading products by (1) enabling market participants to use a simple, intuitive graphical interface to initiate complex, multi-algorithm trading strategies through drag and drop motions, (2) enabling users to monitor informational market impact costs in real time, (3) automating the selection, management, and cancellation of algorithms according to user inputs and (4) providing market participants with visual indications that display algorithmic order activity, the type of execution tactics used by the subject system's active algorithms, and the maximum rate of execution that can be safely achieved without triggering additional market impact costs through information leakage, (5) enabling users to monitor both their trading positions and the market's position against a benchmark in real time, and (6) providing users with a perspective on where a particular stock fits within the larger context of the market.

One important definition of market impact is offered by Doyne Farmer and Neda Zamani in their paper entitled, "Mechanical vs. informational components of price impact," http://www.santafe.edu/research/publications/workingpapers/06-09-034.pdf) However it is important to note that while the inventors have selected this definition of market impact for use in this application, there are many other functional definitions of market impact which could be substituted for this definition and are hereby covered by scope and spirit of this application.

In their paper Farmer and Zamani note that, "it is well known that trading impacts prices—orders to buy drive the price up, and orders to sell drive the price down." However they then go on to decompose the concept of "market impact" into two distinct components: mechanical and informational impact. Mechanical impact is defined "in terms of the change in the mid-point price when an event is removed, but all other events are held constant;" meaning that mechanical impact is the inevitable change in price due purely to the presence of the event. On the other hand, informational impact is defined as the portion of total impact that cannot be explained by mechanical impact, the component of market impact that is most sensitive to changes in trading tactics.

The inventors subscribe to the conceptual differentiation between mechanical impact and informational impact as explained in Farmer and Zamani, and from this point forward, when the term "market impact," is used in this application, it will refer to informational market impact. However, while Farmer and Zamani only quantify market impact as an "after the fact" average based on a large number of experiments; the inventors propose that informational market impact can also be measured in real time by tracking the execution rate anomaly of an algorithm, or the difference between the algorithm's expected rate of execution and its actual rate of execution.

This proposal embodies the conjecture that execution rate anomaly can be used as a proxy for informational market impact. The inventors believe this a valid correlation because unexpectedly low execution rates are usually the clearest sign available that other market participants are changing their perception of fair price due to the algorithm's order placement activity. Abnormal execution rates can logically be attributed to exogenous factors influencing the price of a stock; the most common of which are information leaks about pending or potential trades in the market. These information leaks are the most common drivers of trading anomalies; because when the leaks occur it becomes more difficult to fill orders as the leaks simultaneously discourage potential counterparties who fear being on the wrong side of potential price moments, and encourage potential competitors who hope to profit from these same potential price moments. As a result, information leaks often cause a reduction or increase in the rate of execution to a level below or above what would have been otherwise expected. On the other hand if the execution rate is normal, it is logical to assume that information is not being leaked or if it is, the leaks are not significant enough to have the effect of discouraging potential trade counterparties or encouraging potential competitors.

Because of this tight correlation between execution rate anomaly and information leakage, the subject system relies on a real-time measurement of the difference between the expected and the actual rates of execution of its algorithms as real-time indication of market impact. More specifically, the subject system deems an algorithm to be "successful"—defined as not leaking enough trade information so as to cause any significant market impact, if its actual rate of execution is no more than one standard deviation below the expected rate given the current state of the market. On the other hand, if the difference between the expected and actual rates of an algorithm's execution is greater than one standard deviation, then the subject system deems that algorithm as "failing"—defined as causing enough information leakage so as to drive noticeable market impact. As a result, this measurement serves as an indication as to whether a tactic is successful and should be left in operation, or if it is failing and needs updating. To minimize the need for such updates, the subject system utilizes a predictive model to pre-empt tactical failure based on real-time market information including the market response to the algorithm's orders, and whenever possible, updates the tactic before it is found to fail.

The rate of execution of a tactic is defined as the number of shares executed by the tactic during the time interval for which it was in operation, divided by the total shares printed to the tape during the same time interval. To determine the expected rate of execution for each of the tactics employed by its algorithms, in one embodiment the subject system first determines the current value of a technical price momentum indicator using technical analysis algorithms well known to those skilled in the art. It then looks up in a table stored in a database the historical average participation rate achieved when the momentum was within 5% of the current value. This database table is populated with records of past trades, storing in each case the achieved participation rate and the momentum at the start of the trade. In other embodiments, other prediction models including multivariate models such as Neural Networks, Linear Regression models or other predictive models known in the art can be used to map a quantitative representation of the current state of the market to an expected execution rate for the given tactic.

Once the tactical algorithm is operating, its actual rate of execution is determined by calculating the shares executed by an algorithm divided by the total shares printed to the tape. In the subject system, the expected rate of execution is compared with the actual rate of execution at the end of intervals comprising the greater of one minute or 5 prints on the tape; if the difference between the two numbers is greater than one standard deviation then the subject system either adjusts the tactic or cancels it and selects a new tactic accordingly. Alternate embodiments employ an exponentially-decayed moving average of this execution rate measure. Importantly, the subject system also anticipates tactical failure by monitoring market response to the algorithm's orders, and predicting the likelihood of low execution rates based upon this conditioning information; if the likelihood of a low rate is above a pre-configured threshold value then the subject system pre-emptively adjusts the tactic or cancels it and selects a new tactic accordingly. Indicators of market response include orders placed by third parties immediately following the algorithm's orders, the cancellation or execution of orders on the contra side, or adverse price movements. Those skilled in the art will easily imagine other methods for detecting when the actual observations invalidate the expectations based upon which the tactic was selected.

In addition, it is important to note that while the preferred embodiments of the subject system described herein reference primary usage in the financial, and in particular the equities market, this invention could also be used in a range of industries beyond the financial markets, including but not limited to financial derivatives such as futures and options, commodities, airline tickets, manufacturing parts, or any other fungible items traded on an electronic marketplace, where a large order can be broken down into a plurality of smaller orders.

BRIEF DESCRIPTION OF THE DRAWINGS

Preferred embodiments of the present invention will be set forth in detail with reference to the drawings, in which:

FIG. 1 shows a watch list having symbols representing securities;

FIG. 2 shows the watch list of FIG. 1, except with an enlarged symbol;

FIG. 3 shows a dashboard;

FIG. 4 shows the dashboard of FIG. 3 with a behavior matrix and a display of execution rates for a selected tactical algorithm;

FIG. 5 shows the dashboard with a fishbone (i.e., a dynamic, vertical price scale);

FIG. 6 shows an operation of dropping a symbol on a desired participation rate to launch the fishbone for a participation rate algorithm;

FIG. 7 shows an operation of dropping a symbol on the pipeline algorithm to launch an order-entry box;

FIG. 8 shows a positions window;

FIG. 9 shows the positions window with an overall-progress information box;

FIG. 10 shows the positions window with a trade-details information box;

FIGS. 11A-11H show examples of tactic update messages in the strategy-progress area;

FIG. 12 shows the positions window with active orders in multiple symbols;

FIG. 13 shows the positions window for a symbol with multiple active algorithms;

FIG. 14 shows the positions-window toolbar;

FIG. 15 shows the positions-window toolbar in a pipeline embodiment;

FIG. 16 shows a fishbone for an active algorithm launched from the positions window, in which the fishbone shows a limit price for the active algorithm and the current bid/offer;

FIGS. 17A and 17B show an order box launched from the active fishbone used to alter the algorithm's operating parameters;

FIG. 18 shows the fishbone for the active algorithm launched from the positions window toolbar, in which the fishbone shows pending and filled orders FIG. 19 shows the fishbone for an active algorithm launched from the positions window tool bar, in which the fishbone shows liquidity lines representing the effective depth of the book;

FIG. 20 shows the fishbone in a strategy-progress area with a "Display Benchmark Monitor Dial" button;

FIG. 21 shows a benchmark dial area below the fishbone in the strategy-process area in a situation in which the benchmark dial is inactive;

FIG. 22 shows the active benchmark dial below the fishbone in a strategy process area with numeric indicators labeled;

FIG. 23 shows an active benchmark dial below the fishbone in a strategy process area with graphic indicators labeled;

FIGS. 24A-24F show a series of active benchmark dials;

FIG. 26 shows an example of a market context;

FIGS. 28A-28C2 are flow charts showing an overview of the invention; and

DETAILED DESCRIPTION OF THE PREFERRED EMBODIMENTS

Figures 25A, 25B:
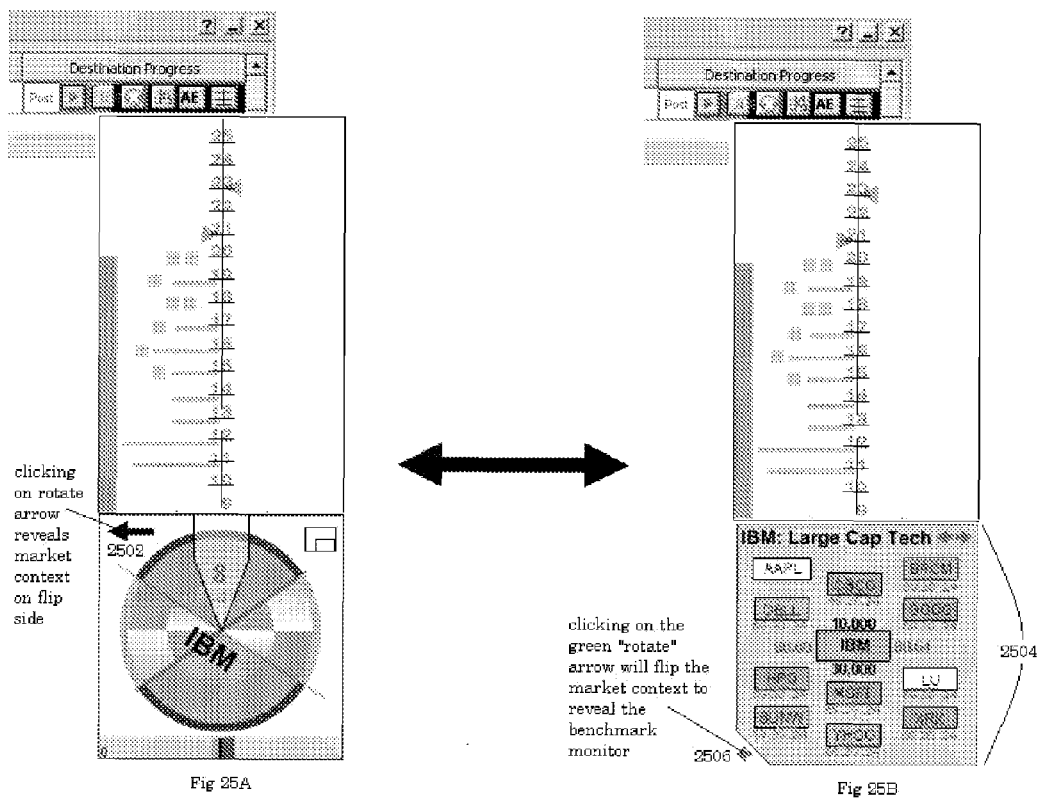
FIGS. 25A and 25B show the use of the "rotate" arrow to flip from the benchmark dial to the market context.

Preferred embodiments of the present invention will be set forth in detail with reference to the drawings, in which like reference numerals refer to like elements or steps throughout.

Definitions of Strategic and Tactical Algorithms as used in the Subject System: A tactical algorithm is a computerized process to execute a large order by repeatedly placing smaller buy or sell orders until the total quantity is completed, wherein the algorithm is optimized to be most effective in specific market conditions, without regard to the possibility that it may not function properly in other market conditions. As such, a tactical algorithm is invoked to execute part but possibly not all of an order, with the limited tactical objective such as minimizing informational market impact in the current market environment. A strategic algorithm is a computerized process to execute a large order by invoking one or more tactical algorithms, depending on the market conditions, to ensure that the process functions optimally at any time. A strategic algorithm is invoked to execute an entire order, and maintain a strategic objective such as minimizing overall market impact costs for the entire order.

In the preferred embodiments, the user can choose between a selection of "strategic" algorithms and a selection of "tactical" algorithms when deciding on which algorithm to use for his trading strategy. For the purposes of this application, a "strategic" algorithm is defined an algorithm capable of automatically selecting, initiating, and then managing a group of tactical algorithms according to pre-programmed logic that dictates which algorithms are best suited to respond to specific market conditions or specific changes in market conditions. In the case of the preferred embodiment, the subject system offers three strategic algorithms: the "Adaptive" algorithm, the "Execution Rate" algorithm, and the "Pipeline" algorithm.

In this preferred embodiment, all three strategic algorithms use expected rate of execution as defined in the summary section to select and initiate the algorithm best suited to fill a user's order given existing market conditions. Then, all three of these strategic algorithms use a measure of market impact defined in the Summary Section—the difference between expected and actual rates of execution—as an indication of whether or not the selected tactical algorithm is succeeding and should be left "on," or if it is failing and must be turned "off." However, while the preferred embodiment employs strategic algorithms that use execution rate and execution rate anomaly to drive the selection and management of tactical algorithms, one skilled in the art could easily imagine an embodiment where the strategic algorithms employ other logic and feedback mechanisms to drive the process of selecting and managing their available universe of tactical algorithms.

While a strategic algorithm is an algorithm capable of initiating and then managing a complete trading strategy in the face of changing market conditions, a tactical algorithm can only place and manage a series of discreet orders according to pre-programmed instructions. A specific example of a tactical algorithm is an algorithm that posts 100 shares on the bid, cancels if unfilled after 2 minutes, posts again on the new bid, and so on until the total desired quantity has been purchased. Therefore a tactical algorithm is a relatively simple algorithm that follows a single behavior which is characterized in how it reacts to events and data from the market.

It is important to note the distinction between strategic algorithms and tactical algorithms. When a user selects a strategic algorithm, he does not have to decide which tactical algorithms are best suited for the existing market conditions, nor does he have to manage the level of the tactical algorithm's aggression as the market moves. The only pieces of information the trader needs to provide when he uses a strategic algorithm are his trading parameters, for example (but not limited to): size and price. On the other hand, when a trader uses a tactical algorithm he must both select the algorithms and set the parameters for the algorithm's operation. In addition, he must manually change these operating parameters to maintain his strategy as market conditions change.

The Subject System's Strategic Algorithms:

As previously noted, the preferred embodiment of the subject system offers users three strategic algorithms: the Adaptive algorithm, the Execution Rate algorithm and the Pipeline algorithm. As a strategic algorithm, the Adaptive algorithm is an algorithm that uses a measurement of market impact as defined in the summary section to automate the selection and management of a set of tactical algorithms in keeping with a strategy that can be summarized in two goals: ensuring that an order is completed and minimizing market impact while the order is being worked.

To translate these high-level goals into order executions, the Adaptive algorithm uses a calculation of expected execution rate to determine which tactical algorithm is best suited for the current market and to define a set of operating parameters for that tactical algorithm. These operating parameters include but are not limited to limit price and aggression level. Then once the selected tactical algorithm begins to work the order; the subject system monitors both changes in market conditions and the algorithm's actual rate of execution, and adjusts its operational parameters or selects a new tactical algorithm to ensure that the rate of order executions stays inline with the Adaptive algorithm's two primary goals. More specifically, the Adaptive algorithm will select and then manage its tactical algorithms such that the actual rate of execution does not fall more than one standard deviation below or two standard deviations above the expected rate of execution, based upon the assumption that a strong mismatch between expected and actual rate of execution is a reflection of informational leakage. Furthermore it will always terminate any tactical algorithms that result in actual execution rates below 5%.

To calculate the expected rate of execution within existing market conditions for each of the tactical algorithm within its universe of control, the Adaptive algorithm uses the current value of a technical price momentum indicator which the subject system pulls from a table stored in the computer's memory. To populate this table, a historical database of past trades is used to calculate the historical average rate of each tactic for various ranges of values of price momentum. Then once the Adaptive Algorithm accesses this table containing the expected rate of execution calculated for each of its tactical algorithms within the existing market conditions; it compares such expected rates to the overall average rate of execution of said tactical algorithms, in order to determine the marginal effect of the momentum on the expected execution rate. This difference between the expected rate given the current market conditions and the overall average rate for this tactic will be called the rate anomaly below. The Adaptive algorithm selects the tactical algorithm with the lowest rate anomaly—and by correlation the lowest rate of market impact. Tactical agents are classified as "slow", "normal" and "aggressive" according to their designed speed of execution; the expected rate of the "normal" rate tactic with the lowest rate anomaly will be referred to below as "red-line" rate: it is a proxy for the highest rate one would expect to accomplish without making the algorithmic trading activity easily detectable by other market participants.

Once the tactical algorithm is operating, its actual rate of execution is then compared with the expected rate of execution at the end of every minute interval. The actual rate of execution is determined by the shares executed by the tactical algorithm divided by the total shares printed to the tape; usually provided as a percentage. If the actual execution rate falls more than one standard deviation or rises more than two standard deviations from expectations, that particular tactical algorithm is disabled and replaced by a new tactical algorithm selected via the same mechanism as described above. To prevent itself from selecting the same tactical algorithm twice in a row, the Adaptive algorithm remembers the three most recently disabled tactics and will not select them as long as they are on the list of the last three tactical algorithms selected. While this embodiment of the Adaptive algorithm employs this measurement of execution rate anomaly as a mechanism for driving the selection and management of tactical algorithms, other mechanisms for selecting tactical algorithms imagined by those skilled in the art also apply.

The "Execution Rate" algorithm is also a strategic algorithm. However, while the purpose of the Adaptive algorithm is to automate a trading strategy based on minimal market impact, (measured as the difference between actual execution rate and the expected rate for that tactic given the current market conditions), the purpose of the Execution Rate algorithm is to give the user the flexibility to automate a trading strategy according to the specific level of market impact with which he is comfortable. For instance, the Execution Rate algorithm would be ideal for a trader who has more time to complete his order and wants to use an execution rate that is lower than the Adaptive algorithm's stated participation rate target (for example, 20% execution rate), or for a trader who has less time, is not worried about market impact, and is willing to accept a more aggressive execution rate in order to get more done in a shorter timeframe.

Just like the Adaptive Algorithm, the Execution Rate algorithm uses the measurement of market impact as defined in the summary section to select and then manage the universe of tactical algorithms at its disposal. However, when a user initiates the Execution Rate algorithm, the subject system does not assume that the user's preferred execution rate is the posted value (20% in the above example) for the Adaptive algorithm. Instead, when the user initiates the Execution rate algorithm, he must select his preference for expected execution rate; anywhere from 5% up to 40%. Then once the user indicates his preferred execution rate, the subject system selects the tactical algorithm and associated operating parameters that will best meet the user's input given the existing market conditions. Again, the subject system uses the same methods for calculating the expected rate of execution for each of the available tactical algorithms described in the summary section and in the description the Adaptive algorithm's operating procedures.

Then, as the tactical algorithm begins to work the order, the subject system monitors the actual rate of execution, determined by the number of shares executed by an algorithm divided by the total shares printed to the tape, at the end of each minute interval. It then compares the expected execution rate selected by the user and the actual execution rate, and if the difference between the two numbers is greater than one standard deviation, it makes adjustments to the operating parameters and/or the tactical algorithm in use to ensure that the Execution Rate algorithm maintains the rate selected by the user.

The Pipeline Algorithm is the subject system's third strategic algorithm, but is only available in the embodiment associated with the Pipeline alternative trading system. It is important to note that while there are many figures, examples and elements in this application that reference an embodiment of the subject system adapted for use with the Pipeline Trading system, the subject system is designed to work as an adjunct to any proprietary trading system or trading platform, and the use of examples from the embodiment developed for Pipeline in no way limits the scope or application of the subject system.

The purpose of the Pipeline algorithm is to allow users to initiate a strategy which will place block orders on the Pipeline trading system when certain conditions are met. For example, a user can indicate specific prices or price ranges when he would want to place or cancel a block order on Pipeline. A user can also specify the size of the blocks that are placed, as well as the frequency with which blocks are replenished after fills. In addition, the Pipeline Algorithm allows the user to coordinate the entry and cancellation of blocks on Pipeline with the user's other algorithmic activity conducted via the subject system in the same symbol.

Finally, to further reduce the number of times a trader must respond to the Pipeline system, a trader can use the Pipeline algorithm to set a price limit for automatically accepting passive counter-offers that fail to execute at the reference price but fall within the NBBO, and/or to designate the specific circumstances when he would be willing to accept a trade outside of the midpoint—for example where the current offered price is below the 10-minute trailing average price, or other price validation methods that can be imagined to those skilled in the art.

In addition, those skilled in the art could imagine other order entry elements related to trading on the Pipeline System that not are included here but are covered in the scope and spirit of this application. When used in conjunction with either the Adaptive algorithm, the Participation rate algorithm or any of the tactical algorithms, the Pipeline algorithm ensures that a user will not miss the opportunity for a block cross while he works his order in smaller increments through the subject system's other algorithmic offerings.

Finally, it is important to note that while the preferred embodiment only incorporates these three strategic algorithms, other embodiments which include other algorithms, either those associated with the subject system or offered by third parties (e.g. brokers and independent vendors), can easily be imagined by those skilled in the art and are included in the scope and spirit of this application. In addition, one skilled in the art could also imagine an embodiment wherein the subject system includes a strategic algorithm which employs the same mechanisms used by the Adaptive and Execution Rate algorithms to select, manage and switch between the subject system's universe of proprietary tactical algorithms to select, manage and switch between a set of third party algorithms. Such a strategic algorithm would eliminate the need for a user to have to choose which of the hundreds of broker-sponsored/third party algorithms are best suited to work an order under existing market conditions, rather he could rely on the subject system's real time selection and management mechanisms to choose and then switch between a set of third party algorithms as the order parameters and market conditions evolve over time.

The Subject System's Tactical Algorithms:

In addition to the "Strategic" algorithms described above, the subject system also offers the user a selection of tactical algorithms. Direct access to these tactical algorithms are provided for the user who wants to use algorithms to automate order entry but does not want to turn over the selection and management of tactical algorithms to a strategic algorithm. As previously defined, a tactical algorithm is an algorithm concerned with placing and canceling orders according to a single set of pre-programmed instructions. Providing a selection of tactical algorithms allows the user to automate his trading while maintaining a higher degree of control over the placement and cancellation of orders. It is important to note that when the user employs tactical algorithms, he must both select the algorithms and set the parameters for the algorithm's operation. In addition, he must manually change these operating parameters to maintain his strategy as market conditions change. The subject system enables the user to set and alter these parameters through simple drag and drop motions, as will be described in more detail below.

However, while the use of these tactical algorithms does require greater involvement from the user, a trader can use these tactical algorithms to automate a complex trading strategy by initiating a plurality of tactical algorithms for the same stock. Here is an example: a user initially activates a single algorithm to buy 800,000 shares of EBAY up $30.55. However, let's say that after he initiated that algorithm, he realized that the stock was more volatile than he originally thought. Instead of canceling that first buy algorithm, he decides to layer a few more tactical algorithms to create a more nuanced strategy to match the volatility of the market. So in addition to the original buy algorithm, he adds another algorithm to buy aggressively when the price drops below $30.48, another to sell passively when the price moves up to $31.57, and another to sell aggressively if the price moves above $31.60.

Once the user has initiated all four of these tactical algorithms for EBAY, the subject system's "unified" setting ensures that the user can manage all these individual tactical algorithms as part of unified strategy. This unified setting treats every order from a user-initiated tactical algorithm associated with a given symbol as part of a larger aggregate order. For example, as soon as two or more algorithms are associated with a single symbol, the subject system automatically coordinates the activity of each of those algorithms against a single, aggregate position goal. That aggregate position goal is always established when the trader launches the first algorithm for that particular symbol—in this example the order to buy 800,000 shares of EBAY. This coordination is preferably enabled by keeping track of all open orders, the position goal, the achieved position, and limit the size of new orders to be placed on the market in such a way that the sum of the achieved position plus open orders never exceeds the initial, aggregate position goal.

In cases where both buy algorithms and sell algorithms are being used, the algorithms that are working in the opposite direction to the stated position goal are limited to place orders that will never in aggregate exceed the original aggregate position goal. For example, if the user's initial aggregate position goal is to buy 800,000 shares of EBAY, and the achieved position is 500,000 shares of EBAY, with 100,000 shares pending (potentially leading to a position of 600,000) at the time the additional three algorithms are initiated; then an algorithm seeking to place a new buy order will be limited to a maximum of 200,000 shares, and an algorithm seeking to sell will be limited to 500,000 shares.

Therefore as a result of this "unified" setting, the subject system automatically coordinates the order activity driven by all user-initiated tactical algorithms for a particular symbol such that those algorithms will only place orders that both follow their pre-programmed logic and keep the trader's position inline with that original position goal. This feature enables the trader to employ a plurality of algorithms with specialized tactics in a coherent strategy without having to micromanage his order position. In addition, the subject system provides the trader with multiple high-level visual cues (described in detail below) that allow him to track his progress relative to his aggregate position goal. As a result, the subject system is able simultaneously to pull the trader away from order level micro-management while enhancing his capabilities for higher level strategy management.

Deciding on an Algorithm

As previously noted, a user has the ability to choose between strategic and tactical algorithms when using the subject system to automate his trading strategy. Because the direct selection of tactical algorithms requires more thought and management by the trader, the subject system includes two tools to help the users who decide to select manually tactical algorithms rather than relying on the strategic algorithms to mange this selection for them. These two tools are the Execution Rate Scale and the Behavior Matrix, both of which are designed to help the trader understand how each tactical algorithm will interact with the market.

The Execution Rate Scale is a tool that provides users with a comparative measure of the expected rate of execution for each of the different tactical algorithms. The purpose of this scale is to help users understand how aggressive each tactical algorithm is on a relative basis by presenting a scale that indicates where each of the available tactical algorithms falls on a scale of aggressiveness—both relative to the other tactical algorithms and as compared to a percentage scale that represents expected rates of execution. The scale appears on the subject system's Dashboard whenever a user drags a symbol from a Watch List over one of the tactical algorithms, with the selected tactical algorithm highlighted in yellow to ensure the user knows which algorithm he is considering at the time.

For the purpose of this application, "Watch List" is defined as a representation 100 of a collection of symbols 102 the user is interested in monitoring (FIG. 1). The Watch List may also be connected to the user's Order Management System (OMS) in such a way that the symbol-representing cells within the Watch List are linked to information about the user's order(s) in that symbol. The example shown in FIG. 1 is a Watch List used in Pipeline Trading System's Graphic User Interface (GUI), but any other version of a "Watch List" as known or could be imagined by those skilled in the art can also be used in conjunction with the subject system.

When the user rolls over the symbol 102 in the Watch List that he wants to trade, that symbol is shown as an enlarged symbol 202, so as to make it clear to the user which symbol he is selecting (FIG. 2). Then if the user clicks on that enlarged symbol, the "Dashboard" 300 appears at the base of the Watch List (FIG. 3). For the purposes of this application, the "Dashboard" is the element of the subject system's user interface where the available algorithms are presented to the user. In the preferred embodiment the dashboard only appears when a user clicks on an enlarged symbol in the Watch List so as to limit the amount of terminal real estate occupied by the subject system's user interface. However in an alternate embodiment the dashboard is a permanent aspect of the subject system's user interface, visible whenever the subject system's user interface is open on a user's desktop or terminal.

In the example shown in FIG. 3, the dashboard 300 includes the following elements. The icons for algorithms include those for strategic algorithms (an adaptive algorithm 302, a pipeline algorithm 304, and an execution rate algorithm 306) and for tactical algorithms (a socialite algorithm 308, a reservist algorithm 310, a spray algorithm 312, and a sloth algorithm 314). The various algorithms are explained elsewhere in the present disclosure.

FIG. 4 shows what it looks like when a user has dragged a symbol (here EBAY) over one of four available tactical algorithms, the "Socialite" tactical algorithm, revealing both the Execution Rate Scale 402 (described above) and the Behavior Matrix 404. It is important to note that while FIG. 4 depicts an embodiment with four tactical algorithms (the "Socialite," "the Reservist", "the Spray," and "the Sloth,") limitless other embodiments with any number and variety of tactical algorithms, both proprietary to the subject system and provided by third party providers, can easily be imagined by those skilled in the art and should be understood as encompassed within the present invention.

The second tool for helping users select a tactical algorithm is The Behavior Matrix 404. The Behavior Matrix is an element of the subject system's user interface that gives the user information about the characteristic behaviors of the tactical algorithms available via the subject system. Examples of these behavior-defining characteristics might be whether the algorithm "posts" orders or "takes" orders, places "reserve" orders or maintains a visible "presence," or if it places orders on "ECNs" or on "DOT." Other examples could be whether an algorithm "kicks" or "punches," "ducks" or "blocks," "stands" or "runs."

It is important to note the terms used above are only examples of characteristic descriptors, and that any set terms can be used to describe behavior-defining factors, assuming they have meaning for the traders and serve to describe how the algorithms will behave in different market conditions. The purpose of the matrix, regardless of the terms used, is to give the trader information about how each algorithm will operate without requiring him to understand the specific, detailed logic that drives the algorithm's operation.

To access the Behavior Matrix, the user can either roll the mouse or drag a symbol from the watch list over one of the icons that represent a tactical algorithm (Again, see FIG. 4). When the user takes this action, that tactical algorithm's Behavior Matrix will appear behind the algorithm's icon. For example, in FIG. 4, the user has dragged the EBAY symbol over the "Socialite" icon, one of subject system's the tactical algorithms. By looking at which cells the "dots" of the Socialite's icon occupy in the matrix, the user knows which combination of factors characterize the behavior of that algorithm. Looking at the Socialite example, the user knows that that algorithm will "post" orders rather than "take" orders, place orders on both "ECNs" and "DOT" depending on the available liquidity, and that it will maintain a visible "presence" on the market rather than just placing "reserve" orders. If a dot falls inside a middle cell with a double arrow, (as it does in this example), it means the algorithm will display both of the characteristics within that row depending on the circumstances. It is important to note that the Behavior Matrix solves one of the most pressing problems in algorithmic trading: the need for traders to understand the general behaviors of a particular algorithm without having to know or understand the algorithm's underlying logic.

Drag and Drop Algorithm Selection and Initiation

Once a user has decided which algorithm he wants to use and is ready to initiate an algorithm, all he has to do is drag the symbol he wants to trade from his Watch List and drop it onto the icon on the dashboard that represents the algorithm he wants to use. To ensure the user is aware which algorithm he is selecting, the background of the selected algorithm is highlighted. If the user's Watch List is connected to his OMS in the preferred embodiment, this action of dropping the symbol on an algorithm representing icon automatically launches the algorithm. As a result, the subject system allows traders to initiate complex trading strategies with a single motion; here a "drag and drop," but other single motion techniques as can be imagined by one skilled in the art also apply. With a simple drag and drop on one of the three strategic algorithms, the user of the subject system is able to set in motion a complete trading strategy which automatically selects, initiates and then adjusts the algorithm or set of algorithms required to execute the user's order based on the user's order inputs, real-time analysis of market conditions, and reinforcement feedback on the algorithms' impact on the market.

Alternatively, if the user's OMS is not connected to his Watch List, or if it is connected but the user has deactivated the auto-launch feature; dragging the symbol over any of the algorithm-representing icons (except the Pipeline Algorithm) will reveal a "Fishbone" 502 at the base of the algorithm's icon or its behavior matrix 404 (FIG. 5). For the purposes of this application, the Fishbone is a dynamic, vertical price scale that represents the current bids and offers for the selected symbol. The trader can then drop the symbol at his limit on the price scale; thereby setting the algorithm's limit and initiating the algorithm. In the instances where the user's OMS is connected to the subject system but the user has disabled the auto-launch feature, the Fishbone allows the user to set a limit for the algorithm that is more passive than the limit contained in his OMS. However, as a price-protection precaution, the user cannot use the Fishbone to set a limit for an algorithm that is more aggressive than the limit contained in his OMS. To make the limit more aggressive, the user must make that change within the OMS itself.

While dragging and dropping a symbol anywhere on the icons that represent the Adaptive algorithm or any of the tactical algorithms will either initiate the algorithm (if watch list is connected to the OMS) or launch the fishbone (if the OMS is not connected to the watch list or if the OMS is connected but auto-launch feature is disabled); to initiate the Execution Rate algorithm or to launch its Fishbone, the user must drag and drop the symbol onto the specific execution rate that he wants to set for the algorithm (FIG. 6). In addition, dragging and dropping a symbol onto the Pipeline Algorithm in the instances where the watch list is not connected to the OMS or it is but the auto-launch feature is disabled will not launch a Fishbone. Instead it will launch an order entry box 700 where the user can set all of the parameters that relate to the timing, frequency and circumstances (as detailed above) for when a block order should be placed or canceled on Pipeline (FIG. 7).

In the cases where the watch list if not connected to the user's OMS or it is connected but the user has disabled the auto-launch feature, the user can initiate an algorithm by hitting the buy (or sell) button inside the Fishbone or the order entry box for the algorithm he has selected.

The Provision of Real-Time Feedback Regarding Algorithm Operation and Order Execution Once an algorithm is initiated, either automatically or by the user, a "Positions" window 800 replaces the dashboard and fishbone at the base of the Watch List (FIG. 8). For the purpose of this application, the "Positions" window is defined as the aspect of the subject system that provides users with real-time feedback regarding the algorithms' order activity, the execution tactics being used by the active algorithms, and the effectiveness/impact of these tactics.

In the first column within the Positions window, users are given a button 802 that they can use to cancel all of the orders that have been placed by the algorithms working on that order. Looking at the remaining columns in the Positions window from left to right, the user can see: the side of the order being worked by the algorithm (804), the symbol being worked by the algorithm (806), a list of trade details for executed orders (808—revealed when the user clicks on the binocular icon, more detail below), how much of the order has been completed vs. how much of the order remains unfilled (810), the average price across all executed orders in that symbol (812), the algorithm or set of algorithms being used to work a particular symbol along with its average execution rate (814), and feedback regarding the tactics in use and whether or not these tactics are successful or need updating. (816).

This Positions window is unique in the world of algorithmic trading products in that it providers users with the "Details," "Overall Progress," "Routes", and "Strategy Progress" columns to give the user information about which algorithms are working a particular symbol, the shares those algorithms have filled, the tactics being used by the active algorithm or algorithms, the impact of these tactics on the market, and the effectiveness of these active algorithms; rather than expecting users to trust what an algorithm is doing without giving them any specific information about what it is actually doing. In addition, the Position window also provides the user with quick and easy access to a range of functionality for managing active algorithms.

In the column labeled "Overall Progress," the subject system uses dynamic bars in different colors to provide a real-time representation of how much of the user's order has been completed and how much of the order remains unfilled. In FIG. 8, in the overall progress monitor 810, the blue bar 818 represents the portion of the order that has already been filled by the algorithm, the orange bar 820 represents the portion of the order that is active, but has yet to be filled, and the red bar 822 represents the portion of the order that is unfilled and inactive. While blue, orange and red coloring is used in this example, any other colors or patterns could be used for the same effect.

In addition, each of the colored bars 818, 820, 822 contains an inequality that gives an approximation of the number of shares represented by that bar. As shown, there are a ">5 mm" on the blue bar, ">2 mm" on the orange bar, and ">3 mm" on the red bar; meaning that on the EBAY order represented in this line of the Positions window in FIG. 8, more than five million shares have been filled, more than two million are unfilled and active, and more than three million shares are unfilled and inactive.

In addition to seeing the approximate values for shares filled, active unfilled and inactive unfilled on a particular order; the user can also use the Overall Progress column 810 to see the exact number of shares and the percentage of the total order represented by each of these three categories. When the user scrolls over and pauses on any area of the Overall Progress column 810, an information box 900 appears (FIG. 9) with the following information: the exact number of shares that the algorithm has filled versus the total number of shares in the order, the exact number of shares that are active, unfilled versus the total number of shares in the order, the exact number of shares that are inactive, unfilled versus the total number of shares in the order, the percentage for each of these categories, the average price across all of the filled shares and whether or not there is a "Market Participation Warning" 902.

A Market Participation warning 902 is an indication that the subject system uses to let the trader know that the number of unfilled shares on the order is greater than the subject system's projected remaining volume in the market for that symbol for the remainder of the trading day. To calculate whether or not it needs to issue the warning, the subject system calculates the number of shares it expects would be executed over a time period extending from the current time to the close of the market. To this end, it multiplies the expected execution rate as previously defined herein, by the historical average volume traded during the time period in days past, taking the average over the last 60 trading days. The Market Participation Warning is issued if the number of unfilled shares is less than the number of shares it expects to execute. In addition to inserting the Market Participation Warning at the base of the information box, the red bar that represents the unfilled, inactive portion of the order in the Overall Progress column also flashes red where there is a Market Participation Warning.

Taken together, the elements contained within the Overall Progress column offer the user a fast yet detailed perspective on the status of his order. However, if the user wants even more detailed information about his executed orders, he can click on the icon located in the "Details" column of the Positions window 808. Clicking on this icon launches a "Trade Details" information box 1000 (FIG. 10). The purpose of this information box is to give the user specific information on each order executed by the algorithm. For each executed order, the Trade Details information box gives the user the "Strategy" that executed the order (in FIG. 10 this is the Adaptive algorithm), the time the order was executed, the number of shares in the order, the average price of the order, and the name of the specific tactical algorithm that executed the order.

In some instances, i.e. when a user has initiated a tactical algorithm, the "Strategy" information and the "Algorithm" information will be the same since as a "strategy" a tactical algorithm only follows one set of behaviors. However in the instances when the user initiates a strategic algorithm, the strategy and algorithm information will be different. For example, if the user initiates the Adaptive algorithm, the Strategy column will reflect that it is the Adaptive algorithm at work, while the "Algorithm" column will reflect which of the specific tactical algorithms the Adaptive algorithm used to complete that segment of the larger order. In the example of FIG. 9, the Adaptive Algorithm used the "Reservist" tactical algorithm to execute the first portion of the order, while it used the "Socialite" tactical algorithm to execute the second and third portions of the order. Providing this level of information regarding a strategic algorithm's logic and execution is a revolutionary development in the world of algorithmic trading products—for the first time, the user is being informed about the specific tactics the algorithm is using to complete the order, not simply expected to trust a "black box."

For even more specific information about the tactics being used by the algorithm, the user can turn to the Behavior Matrix included in the "Strategy Progress" column 816 on the Positions window. While the Behavior Matrix is used in the Dashboard to allow the user to review the characteristic behaviors of the tactical algorithms before they are active, when it is used in the Strategy Progress column, it allows the user to see the characteristic behaviors of the algorithms after they have been initiated. As previously noted, examples of the behavior-defining characteristics that can be used in the matrix are whether the algorithm "posts" orders or "takes" orders, places "reserve" orders or maintains a visible "presence," or if it places orders on "ECNs" or on "DOT."

In the "Strategy Progress" area 816, each of these characteristics is represented by a cell labeled with the name of the characteristic. FIG. 8 shows a Post call 824, a Take call 826, a Reserve call 828, a Pres cell 830, an ECN cell 832, and a DOT cell 834. As a particular tactical algorithm works an order, the cells that define the tactics of that algorithm are highlighted, letting the user know what kinds of tactics the algorithm is using at a given moment in time. If, for example, the user has employed the "Adaptive Algorithm" as described above, and the automated selection function determines that the level of market impact caused by an active algorithm is too high; then the system notifies the user of the algorithm's (or tactic's) failure to meet the order requirements and its pending cancellation by outlining in red the cell(s) in the Behavior Matrix that represent the failing tactic/algorithm. When the subject system cancels that algorithm or that tactic, the same characteristics that were outlined in red are highlighted with red backgrounds. Then once the subject system has selected and initiated a new algorithm or a tactic better suited to the new market conditions/dynamics, the characteristics of that newly initiated algorithm/tactic are highlighted in green.

By using the black background highlights in conjunction with the red and green color signals, the user knows which tactics are being used to complete his order, as well as which tactics are successful or need updating. Plus, the user is given valuable information regarding market color (feedback on how the market is performing in real time) each time he see that the subject system has made a change in tactics/algorithms—he knows there has been a change in the market or a market event significant enough to warrant an entirely new tactic. In addition, the user can enable a feature which uses the strategy progress area to display which tactical algorithm is active, when there is a change in tactics, and the reason for that change. For example the user might see a message stating, "Transition to Sloth due to sensitivity to postings on ECNs."

FIGS. 11A-11H give a series of examples as to what a user might see while the Adaptive algorithm was working his order. FIG. 11A shows a transition to Sloth due to sensitivity to posting on ECNs. FIG. 11B shows Sloth working. FIG. 11C shows a transition to Socialite due to sensitivity to taking on both ECNs and NYSE. FIG. 11D shows Socialite working. FIG. 11E shows a transition to Reservist due to heavy market presence. FIG. 11F shows Reservist working. FIG. 11G shows a transition to SlothSocialite due to excessive fill rate. FIG. 11H shows SlothSocialite working.

In addition to these fairly simplistic measures of effectiveness provided by the red and green signaling mechanism and the pop-up messaging system, the Strategy Progress column can also expand to provide the user with access to a range of more complicated, continuous measures of effectiveness. While the red/green signaling lets the user know if an individual tactic or algorithm is working; these more complex measures of effectiveness serve to provide the user with a real-time assessment of the overall success/failure of the strategy as a whole. For example, the Strategy Progress column could also include a graphical element that displays a particular algorithm's participation rate in the market since initiation. Or, it could include a ratio between the achieved participation rate and the expected participation rate. An even more sophisticated example would be the absolute value of the logarithm of the ratio of achieved participation rate to expected participation rate, which would provide a measure of the relative difference between actual and expected rates—a good indication of how well the strategy is meeting the user's intended goal. In addition, other continuous measures of effectiveness can easily be imagined, including any number of the benchmarks known to those skilled in the art.

However an important point is that the subject system allows traders to employ complex algorithms to automate their trading and gives them insight into how the algorithms work and how well they are performing when active. Other systems fail to anticipate either automatic tactic switching or the provision of market color feedback. In addition, other systems known in the art fail to anticipate providing guidance on the expected rate of execution or expected market impact in order to help a trader decide which algorithm to use given the current state of the market.

FIG. 12 has been provided to give a specific example of a Positions Window 800' for a user with orders in multiple stocks. FIG. 12 also offers a good example of what the Strategy Progress area looks like when the Adaptive Algorithm is executing orders and making tactical adjustments across many symbols. Looking specifically at FIG. 12, as the Adaptive Algorithm works the user's order in VLO, it has selected aggressive tactical algorithms that are "taking" rather than "posting" orders. In addition these aggressive tactical algorithms had been placing orders on both ECNs and DOT, but the Adaptive Algorithm determined that the tactic of placing orders on DOT was failing, so that tactical was cancelled, as indicated by the red background in the cell labeled DOT.

In the next order, an Adaptive Algorithm working the user's order in CALL initiated a passive tactical algorithm that is "posting" rather than taking orders, and is only maintaining orders as "reserves" rather than maintaining a visible "presence" on the market. This tactical algorithm has also been using both ECNs and DOT when it places orders, but the red outline around the DOT cell indicates that the Adaptive Algorithm is about to adjust tactics and stop placing orders on DOT. In addition, this Strategy Progress window indicates the algorithm responsible for "posting" "reserve" orders in CALL has been recently initiated because the backgrounds of these cells are green.

By simply looking at the Strategy Progress Window, the user has access to a lot of information about both the algorithms working his order and the effectiveness of their tactics. In addition, the user can gain valuable information about market color and changing market dynamics by watching and considering which tactics are failing and which are succeeding in light of market impact tolerance. As a result, users can look to the subject system as both a sophisticated automated trading system and an indicator of changing market dynamics.

It is also important to note that if the user has initiated multiple algorithms for a specific symbol, all of the active algorithms will be represented by their icons in the "Routes" column 814 as in FIG. 13. To see the specific information offered by the other columns about each algorithm, all the user has to do is click on the icon in the "Routes" column that represents the algorithm he wants to see. Once he has clicked on that icon, the information provided in each of the other columns will reflect the information about that particular algorithm.

Providing User Easy Access to Tools for Algorithm and Order Management.

A final aspect of the Strategy Progress area is the ability to use this section of the Positions Window to manage the algorithm working that particular order. Scrolling over any of the cells in the Strategy Progress area reveals a tool bar for managing the active algorithm(s) related to that order (FIG. 14). This tool bar gives users access to a range of functionality with the click of the mouse: it allows users to pause (1402) any algorithms working the order, cancel (1404) any algorithms working the order, re-start (1406) any algorithms that have been paused, launch (1408) the Trade Details Information Box for that order, open (1410) a Fishbone for the active algorithm, or force an "Auto-entry" (1412). In addition, in the embodiment designed for the Pipeline alternative trading system, the tool bar also contains a button 1502 that allows the user to accept a passive counter offer at the NBBO (FIG. 15).

An auto-entry is when the user forces the active algorithm to enter its next pending order immediately, overriding any order-entry delays required by the algorithm's logic. This feature is useful in the instances when a trader knows there is size that he wants to take and does not want to wait for the algorithm's logic to determine that the time is right to enter the order. It also ensures that even if a trader employs a passive algorithm, or an algorithm with a low participation rate that he still has the ability to enter orders aggressively if circumstances require him to do so.

Opening a Fishbone for an active algorithm gives the user the ability to see filled and pending orders, cancel pending orders, or adjust the algorithm's limit price. As soon as a user initiates an algorithm, either through the auto-launch or by manually dropping a symbol onto a Fishbone in the Dashboard, that algorithm is represented visually on the Fishbone with a color-specific vertical column that extends up or down along the vertical price scale (depending if it is buying or selling) to the algorithm's limit price. In the example in FIG. 16, an order in EBAY is being worked by the Adaptive algorithm with a limit to buy up to twenty cents. To help the user track which algorithm is represented on the fishbone 1602, the color of the vertical column 1604 matches the color of the algorithm's icon on the Dashboard. Again, looking at the example in FIG. 16, the color of the vertical algorithm representing column is green to match the background of the Adaptive Algorithm's icon. If there is more than one algorithm working on a symbol, these vertical columns are placed next to each other along the top (or bottom) of the price scale such that the columns do not overlap or obscure each other. These algorithm-representing columns are also interactive tools that can be used to manage the algorithms. To change the limit of an algorithm, all the user needs to do is catch the bottom (or top) of the bar and pull (or push) the bar to the new limit. Alternatively, the user can alter the algorithm's operating parameters by double-clicking on any of the algorithm representing bars. Double-clicking on a bar will display a box 1702 (FIGS. 17A and 17B) which contains information about all of the parameters that the user can set/alter for that particular algorithm. The two examples in FIGS. 17A and 17B illustrate the boxes 1702 displayed to a user when he double clicks on a column representing the adaptive algorithm (the first image) or the Execution Rate algorithm (second image).

Once an algorithm is active, the Fishbone also displays the orders that each of the algorithms have placed and executed. When an algorithm places an order, a small block 1802 appears on the price scale next to the price point of the order (FIG. 18). Therefore a block represents a collection of pending (active, unfilled) shares at a single price point. Users can manually cancel any pending order by double clicking on a pending-order block. Then, once an order or part of an order has been filled, the block or blocks that represented those shares when they were pending orders disappears, and a horizontal bar representing the filled shares appears (FIG. 18).

In addition to the features already noted, the Fishbone also includes an indication of the bid/ask spread and a representation of the effective Depth of Book. Small grey arrows (1606, 1608 in FIG. 16) appear on the price scale next to the price points that represent the bid and ask, while the Effective Depth of Book is represented as a gray line (1902 in FIG. 19) indicating the amount of size likely to be available at each price point at and above the current best offer and at and below the best bid. The effective depth can be defined as the displayed quote sizes aggregated over multiple market destinations, as is known in the art. However, this representation of book depth fails to capture hidden liquidity (reserve orders) or latent liquidity (orders that have not yet been placed on the market). For a long time the trading community has expressed the need for a depth of book indicator that incorporates an estimate of reserve and latent liquidity along with the aggregated displayed liquidity. The subject system preferably attends to this need by calculating the amount of liquidity that would be needed to push the price of the stock through various price points. More specifically, the number of shares that would trade at a $20.01 offer before the price moved up to $20.02 would be the "effective offer size" at $20.01. While this amount may be considerably larger than the displayed liquidity, it could also be smaller that the displayed amount if it turns out that the displayed size was only a fleeting quote. In order to calculate an effective offer size at a given offer price, the subject system looks back at price and quote changes to find most recent time in the past when this same offer price was the best offer and said best offer was completely filled leading subsequently to a new higher best offered price. It then calculates the total number of shares that traded while the original offer price was available, counting shares printed at any price but only during the period of time during which the offer was available. This total number of shares is the effective offer size; it represents the total number of shares required to push a security's price through that offered price level. Similarly for the effective bid, the subject system identifies the most recent time that this bid was completely consumed and counts the number of shares that traded before the bid was dropped. If there is no prior example in the same day of pushing through the given bid or offer, the subject system assumes the effective bid (offer) size is the average effective bid (offer) size over all other price points for which there are prior examples. A more elaborate model for calculating the effective liquidity at each price point is given in the appendix titled "An empirical study of resistance and support on Liquidity Dynamics." Other algorithms for inferring the likely number of shares that can be executed before pushing the price through a given bid or offer price level can be imagined by those skilled in the art.

To calculate "effective quote size," as defined above the subject system employs an algorithm that is connected to a real time feed of market prints which includes information about every trade, including the trade price and the size of the trade as reported to the tape. Prints are aggregated into buckets, each bucket will be later labeled as a "buy bucket" (next price move is up) or a "sell bucket" (next price move is down). Each bucket has a low price and a high price. The first two prices traded are the low and high of the first bucket. While a bucket is open, add all shares printed to the total share count for that bucket. The first print above the bucket high price (or below the bucket low price) closes the bucket; the high (low) price is the "effective offer price" (effective bid price) and the total quantity in the bucket is the effective offer quantity (effective bid quantity). In addition, a pair of in-memory vectors keeps the most recent value of the effective bid size and effective offer size at each price point.

To close a Fishbone launched from the "Strategy Progress Toolbar," the user can click on the "x" (1610, FIG. 16) in the upper right hand corner of the window. Finally, if the Strategy progress tool bar is not used and the user moves his cursor away from the Strategy Progress area, the tool bar disappears until the user scrolls over the area again. This "disappearing tool bar" is a useful feature within the Strategy Progress area as it gives the user immediate access to a wide range of functionality without requiring use of permanent desktop real estate.

Provision of Real Time Benchmark Monitoring

In addition to providing real time feedback regarding the operations of the active algorithms and order executions, the subject system also provides the user with real time benchmark monitoring. This real time benchmark monitoring is provided via a dynamic dial that can be displayed directly below the fishbone in the strategy progress area by clicking on the "Display Benchmark Monitor" button (2000, FIG. 20) if the user has elected to turn this feature "on." While active, the purpose of the dial is to provide the trader with visually-enhanced, real-time feedback regarding the performance of his trading strategy and the performance of the market relative to a particular benchmark through real-time alterations in spatial orientation, shape, size, color, shade, and texture within the dial and its surrounding area. It is also important to note that the user can customize the benchmarks he uses to monitor his trading, and some examples include but are not limited to: market price, market average price, P&L, volume-weighted average price, time-weighted average price, closing price, opening price, or one standard deviation of short term volatility.

FIG. 21 depicts the benchmark dial 2100 in its "inactive" state before an algorithm or algorithms have begun to place orders to work an order. Then once an algorithm begins to work a user's order, the dynamic benchmark monitor moves from this "inactive" state to an "active" state (FIG. 22). For illustrative purposes the following description of the operation of the dial will use VWAP (volume weighted average price) as the benchmark, but as previously indicated this is just one possible benchmark a trader could use and is in no way intended to limit the scope or application of the subject system.

Looking at the active dial in FIG. 22, there are three numbers at the top of the dial, "+4" "8" and "−4. " The number closest to the fishbone, here a "+4" represents a measure 2202 of the trader's executions against the benchmark he has chosen for the dial. Because this example uses VWAP as the benchmark, in this case the number represents how much the trader is beating or missing VWAP on an average price per share basis over some predetermined period of time. In this particular example, the trader is beating VWAP by four cents per share, and the fact that he is beating, rather than missing VWAP is communicated by both the green color of the font as well as the "+" sign in front of the number four.

The number closest to the dial, here a "−4" represents a measure 2204 of the market's current performance relative to the same benchmark. Again, because this example is using VWAP, this means that at this point in time the market is missing VWAP by four cents a share, and the fact that this is a loss is reflected in both the "−" sign in front of the number and the red color of the font.

And finally, the third (middle) number represents the spread 2206 between the other two numbers, and serves as a relative indicator for the user of how his position compares to the market's current position. Again, because this example is using VWAP as the benchmark, this number represents how much money the trader is making on a per share basis relative to where the market is currently trading. Here the number is a positive eight, indicating that at the moment, the trader is making eight cents per share.

Because these numbers represent calculations that use the trader's average price and the market's current price, they are dynamic metrics that change along with movements in the market's position and the trader's aggregate position. In addition, the information communicated by these numbers is also displayed graphically inside of the monitor. First, as the metrics fluctuate, the bars that run through the center of the dial rotate about the central axis. By looking at the rotation of each bar relative to its horizontal or "0" position in the inactive state, the trader can quickly assess both how the market is currently performing relative to the benchmark and how the his algorithms are performing relative to the benchmark. To assess the market relative to the benchmark, the user can look at the displacement of the red bar 2302 from the "0" position 2304 and the size and color of the pie-shaped area 2306 at the center of the dial. In FIG. 23, this area is labeled, and with a quick glance it is evident that the market is missing VVAP by a significant margin, indicated by both the size of the pie shaped wedge and the red shading inside that wedge.

Then to assess his position relative to the benchmark, the trader can look at the displacement of the blue bar 2308 from the "0" position 2304 and the size and color of the trapezoid shaped area 2310 along the outer edge of the dial. This area is also labeled on FIG. 23. With a quick glance at this area, it is also easy to see that the trader is beating VWAP by a significant margin, indicated by both the size of the trapezoidal area and the green shading within that area. As the difference between the market or the trader's position and the benchmark increases, both the size of the area and the severity of the shading within the area increase. Likewise, as the difference between the market or the trader's position and the benchmark decreases, both the size of the area and the severity of the shading within the area decrease.

Finally, the trader can also get a quick visual indication of how well he is doing relative to the market by looking at the size and color of the band 2312 formed along the perimeter of the dial in between the red market representing and the blue trader representing bars. Both the size and color of this band help communicate to the trader if he is making or losing money relative to the market, as well as the degree of this gain or loss.

In addition to FIG. 23, FIGS. 24A-24F are included to help illustrate the dynamic nature of the benchmark dial and demonstrate how the benchmark dial would look over time as changes occurred in both the market and the trader's position.

In FIG. 24A, the trader is beating VWAP by 4 cents, the market is missing VWAP by 4 cents, and, as a result, the trader is making 8 cents per share.

In FIG. 24B, the market has moved further in the trader's favor. Now the trader is beating VWAP by 5 cents, the market is missing VWAP by 5 cents, and the trader is making 10 cents per share. The market-representing wedge and the trader-representing trapezoid are larger, and the red and green shadings are darker.

In FIG. 24C, the market has turned. Now the trader is beating VWAP by only 3 cents, the market is missing VWAP by 2 cents, and the trader is only making 4 cents per share. Also, the sizes and color depths in the shaded areas have changed.

In FIG. 24D, with continued movement, the trader and the market are now even, both beating VWAP by one cent. As a result, the trader is now even with the market.

In FIG. 24E, as the market continues to move, the trader is now missing VWAP by 2 cents, while the market is beating VWAP by 3 cents. As a result, the trader is now losing 5 cents a share.

In FIG. 24F, in a total reversal of fortune, the market has moved such that the trader is in the very opposite position from where he started. He is missing VWAP by four cents, the market is beating VWAP by 4 cents, and the trader is losing 8 cents per share.

In certain embodiments, the color of the background behind the benchmark dial also changes in color and depth of color to reflect the trader's positive or negative deviation from the benchmark. In these embodiments the specific color and shade matches that of the trapezoidal area formed on the outer edge of the dial by the displacement of the blue bar from the "0" position and simply serves as a visual reinforcement of whether or not the trader's selected strategy is succeeding (a green background) or is failing and in need of an update (a red background.)

Together, all of these elements give a user real-time numeric and visual feedback regarding the status of his position relative to a benchmark and the market. In addition, the benchmark also gives the trader a visual depiction of how close he is to meeting his aggregate position goal in a particular symbol at any given point in time. To display this information, the background area "behind" the monitor's dial "fills up" or "drops down" as the trader's overall position in a symbol moves closer or father from meeting the initial aggregate position goal. It is important to note that this indicator is based on the assumption the base of the monitor's background area represents the "zero" position where the trader has made no progress towards meeting his aggregate position goal, while the top of the dial's background area represents the 100% mark where the trader has complete that goal. FIGS. 24A-F demonstrate this feature, as the gray-colored background area behind the dial is higher in each successive imagine as the trader's aggregate goal is gradually met over the course of these six images until it is totally filled in the final image, FIG. 24F

In addition to the real-time trading performance feedback, the monitor also provides traders with a graphic that indicates the liquidity ratio between the number of shares available to buy (green) and the number of shares available to sell (red) at the NBBO. A green area represented to the left of a mid-line is as wide the available shares on the bid (with each millimeter in width representing 100 shares); a red area to the right represents the shares available on the offer. This graphic can also be seen at the base of each of the "active" dial images in FIGS. 24A-F. The purpose of the liquidity ratio is twofold: to give the trader a sense of the balance (or imbalance as the case may be) in the available shares on the bid and the offer, and by extension to give him a sense of the volatility of the stock. If there is an even (or close to even) number of shares on the bid and the offer, then it is reasonable for the trader to assume that it is a fairly stable stock that will be hard pressed to move in either direction. On the other hand, if there is a distinct imbalance, it lets the trader know that the stock has the potential to be volatile and serves as a warning to plan accordingly.

Alternate embodiments also include a measure of "price inertia" for the symbol. The price inertia, as defined by the inventors, is the number of shares required to move the stock one cent, and the purpose of this indicator is to supplement the liquidity ratio by giving the trader a more specific understanding of the overall volatility of the stock he is trading. To calculate the price inertia, the subject system tracks the cumulative number of shares that print to the tape as long as the best bid and best offer have not both changed. When both changed this number of shares is recorded as the last available measure of instant effective liquidity at this point, and the cumulative share counter is reset. The price inertia is the trailing average of the five most recent effective liquidity values, signed by the direction of the aggregate price change over these five periods (positive if the price has risen and negative if it has fallen). Other measures of price inertia can easily be imagined to those skilled in the art.

Providing Users with Market Contexts for Symbols Traded

While the purpose of the dynamic benchmark monitor is to give the trader real-time feedback as to the success of his algorithmic trading strategy, the flip side of the dial provides the user with a customized view of market data that gives the user a unique perspective on how a particular stock fits into the larger context of the market. In the subject system, this customized view of market data is called a "market context," and it is specifically designed to give the user a perspective on a stock's position and movement in the market relative to other stocks that meet certain parameters. These parameters can be customized by the user, and include but are not limited to: market sector, correlation, market cap, affinity, blotter, trading style and basket. More detailed descriptions of these parameters are provided below.

To access this "market context," in FIG. 25A, a user simply clicks on the "rotate" arrow 2502 at the top of the benchmark monitor. When he does this, he will flip the benchmark monitor over and reveal a "market context" 2504, or a group of cells oriented around a central, enlarged cell (FIG. 25B). In the illustration in FIG. 26 this central, enlarged cell 2602 is IBM. Each of the cells 2604 included in the market context represents a particular stock, indicated by the symbol name inside the cell. The central cell, also called the reference cell or the reference symbol, represents the stock being traded on the associated fishbone and benchmark monitor, again in this example IBM. The specific group of symbols displayed on a particular context is based on the parameters selected by the user, while the particular arrangement of those cells relative to the reference cell represents the degree of parameter correlation between each cell and the reference cell. In the preferred embodiment, the subject system uses visual cues to transmit information in a way consistent with "self organizing map technology" as known to those skilled in the art.

The user can return to the view of FIG. 25A by clicking on the arrow 2506. There is also a green and red liquidity ratio 2606 at the base of each cell in the market context. The market context includes either the NBBO or in the embodiment for Pipeline Trading Systems, as displayed in FIG. 26 as 2608, the Block Price Range. Clicking the "change parameter" arrow 2610 allows the user to scroll through the various context parameters that are available.

The number of stocks the subject system displays in any given market context can be customized by the user and the map will auto-resize to accommodate the number of stocks the user chooses to include. If at any point a user decides that he wants to add a stock that is not included in a context, all he needs to do is drag and drop that symbol from the watch list onto the market context. When the symbol is dropped onto the context, it automatically "snaps" into the appropriate place relative to the other symbols.

In addition to showing the relationships between the reference symbol and the other symbols, every market context also provides the user with specific information about each symbol included in the context. More specifically, every market context displays the National Best Bid and Offer (NBBO) for each symbol included in the context or in the version of the subject system specifically designed for Pipeline Trading Systems (as in FIG. 26), the Block Price Range replaces the NBBO. Each context also includes a "liquidity ratio" for every symbol. This ratio looks and operates in the same manner as the liquidity ratio at the base of the benchmark dial and is represented graphically at the base of each cell in the market context. As on the benchmark monitor side, the purpose of the liquidity ratio is to give the user a rough indication of how many shares are available on the bid and on the offer at the current NBBO, and serves as a high level indication of volatility of the stock. In an alternate embodiment, the market context also displays directionality of each stocks price movement through the color of each symbol's font. If the average movement of a stock's price over a user-specified period is upward, the symbol's font is blue. On the other hand, if the average movement of a stock's price over that period is downward, the symbol's font is orange.

Finally, in the version of the subject system adapted for Pipeline Trading Systems, the market maps also convey information from Pipeline's proprietary watch list, called the Pipeline Block Board. Looking at a market context like the example in FIG. 26, the user can tell for each symbol whether or not the stock is currently active on the Pipeline Block Board (the symbol's cell has an orange background), if it is currently inactive but was active earlier in the day (the symbol's cell has a grey background), or if it is inactive now and has been inactive all day (the symbol's cell has a white background). In addition, the context indicates if Pipeline has printed a block in a particular stock by giving those cells a three dimensional appearance.

Individually, each of these indicators presents a very high level of information. However, when these indicators are presented in concert, across multiple stocks organized by relational parameters, they provide the trader with a valuable snapshot of the market's position and its relative movement.

As noted above, the user can choose from a range of parameters when customizing a market context. These parameters include, but are not limited to: market sector, correlation, market cap, affinity, blotter, trading style and baskets. The concepts behind the market sector, correlation, and market cap parameters will be obvious to those skilled in the art; however for the sake of clarity we will provide more detailed explanations for the affinity, blotter, and trading style parameters. The basket parameter is described in a separate section as it enables functionality that is distinctly different from the functionality of the other parameters.

The "affinity" parameter refers to grouping securities based on clustering in a multi-factor model. For example, a set of stocks representing companies with divergent business models, but which are subject to the same systemic economic risks (i.e. interest-rate movements, energy prices, etc.)

The "blotter" parameter simply creates a context that includes all of the symbols in a user's blotter. This map offers the user a quick way to get a high level perspective on the movement and position of all of the stocks in his blotter, or to build a basket with symbols from his blotter (as described below).

The "trading style" parameter is a concept specific to the subject system. This parameter displays the set of stocks that "behave" in a similar manner to the reference stock when traded by the same algorithm or algorithms. The subject system's historic, collective information about how a stock reacts when it is traded by one of the subject system's algorithms is used to inform this parameter. In addition, when a user selects this context, right clicking inside the context displays a ranked list of the subject system's algorithms according to their success in trading that set of stocks. This context is a particularly innovative feature as it simultaneously gives the trader a group of stocks that share common trading characteristics and tells him the best algorithms to use on those stocks. It is important to note that any combination of parameters can be used in a single market context. When more than one parameter is used, the subject system simply aggregates and correlates the data from each parameter, and then builds a context based on the final output of that correlation. Because of this feature, the subject system's customized market contexts can range from simple, single-parameters contexts like "Large Cap Tech" in FIG. 26 to extraordinarily complex, multi-parameter contexts.

When the user configures the subject system, he chooses a default set of parameters for his market contexts. This default setting is automatically used to build a context as soon as the user initiates an algorithm. Therefore, when the user flips over the benchmark monitor to access a market context, he automatically sees a context based on those default parameters. If the user decides he wants to change parameters and see a different context, all he has to do is right click the "change parameter" arrow on the top of the market context (FIG. 26). Clicking on this arrow automatically shifts the parameter for the market context and the new parameter is indicated in the title to the left of the arrows. In an alternate embodiment a "change parameter" button is used instead of the arrows. Clicking on this button launches a list of all of the parameters with check boxes next to each parameter. The trader can then select all of the parameters he wants to include in his new context, and then hit the "rebuild context" button at the base of the list to create a new context.

In an alternate embodiment, a trader can launch a market context before he initiates an algorithm, allowing him to bypass the default settings and build a context based on a different set of parameters. To launch a market context directly from the watch list, the user drags the "market context" icon located on the dashboard and drops it onto the stock in his watch list that he wants to use as the reference symbol for the context. In our example, the user would drop the "market context" icon on top of IBM in his watch-list to make a market context for IBM. After the user drops the "market context" icon onto the reference cell (in our case IBM) in the watch-list, the reference cell expands while the surrounding cells in the list simultaneously slide and shrink to accommodate the expansion of the reference cell without impacting the specific order or arrangement of the watch list. (The purpose of this enlargement is to make it clear to the trader which symbol he had put in "market context mode.") At this point, the "market context" feature has been engaged, and the user can customize the parameters for his market context. Right-clicking inside the expanded reference cell in the watch-list displays a list of the context parameters along with a checkbox for each parameter. Once the user has selected the parameters he wants to use in his context, he clicks the "build context" button at the base of the parameter list, and a market context is launched in a separate window. It is important to note that there is no limit to the number of market contexts that a user can have active at any given time. When a user is not looking at a particular context, he can either minimize the context or close it completely, but in the course of a trading day a user can activate and maintain as many contexts, for as many reference symbols as he sees fit.

In the same way that a trader can use the benchmark monitor to access the market context if he launches the monitor first; he can use the market context to access the benchmark monitor if he launches the market context first. By clicking the green "rotate" arrow at the bottom of the market context, the user can flip over the map and see the benchmark monitor for the reference symbol.

An additional feature of the subject system allows the user to streamline the process of launching customized "market contexts." Every time a user chooses a combination of parameters, he has the option to save and name that particular combination. For example, a user might choose to build a context based on the market sector, affinity, market cap and trading styles parameters knowing that he will use that particular combination on a regular basis. To avoid repeating the process of dropping the "market context" icon and selecting that combination each time he wants to build that particular context, he can choose to name and save that combination, using the "save as" feature at the parameter selection step. Once he has named and saved that combination, it will appear as a labeled icon next to the "market context" icon on the watch list. Then the next time he wants to use that same parameter combination to build a context all he has to do is drop that combination's icon onto a reference symbol, automatically generating a context with that combination of parameters in one, easy step.

A final feature related to the market contexts is the ability to use the contexts to build baskets which can then be traded using the available algorithms. If a user selects the "basket" parameter in conjunction with any of the other parameters (market sector, correlation, market cap, affinity, blotter, trading style), he activates the feature that enables him to create a customized basket. To build a basket when the "basket" feature is enabled, the user simply left-clicks on each of the symbols in his market context that he wants to include in the basket. If a user wants to include a stock that is not displayed on his context, all he has to do is "drag and drop" the symbol from the watch list onto the context. When the new symbol is dropped on the context, it automatically "snaps" into the appropriate place relative to the other stocks, and can then be included in the basket. Once the user selects all of the symbols he wants to include, he uses the "save as" feature on the market context to name and save the basket. This "save as" feature is always present on the market context; however it is only "active" when the basket parameter is enabled.

Once the basket has been named and saved, that basket becomes the reference cell, replacing the original reference cell. In our example, if the user created a basket and named that basket MONEY, the reference cell would become MONEY replacing IBM. At the same time, the name of the basket also appears as symbol on the watch list, ensuring that a user only has to create a particular basket one time. Once the basket becomes a symbol on the watch list, it can be treated in the same manner as a single-stock cell on the board; thereby allowing a user to apply the functionality behind any icon to the entire basket of stocks with a single click.

For example, if a user has created an icon for a particular combination of market context parameters, dropping that icon onto the MONEY basket symbol will create a market context with those parameters for the entire set of stocks in that basket. Or in another example, if a user drops the MONEY basket symbol on one of the algorithm representing icons, the system will automatically begin trading every stock in that basket with the same algorithm. A user is preferably enabled to set a percentual tolerance level for proceeding at different rates with various constituents of the basket. The target number of shares of a given item in the basket (e.g. IBM) is the total number of shares to be acquired at completion multiplied by the average completion rate of the entire basket (dollars traded versus marked-to-market dollar value of the basket); the lower and upper bounds on the desirable position in IBM is set by applying plus or minus the tolerance percentage to this target number of shares. Again taking the above example if the IBM order for 100,000 shares is part of a basket that has achieved 15% completion by dollar value and the tolerance level is set to 20%, then the subject system's current target completion for IBM would be 15,000 shares and orders will be placed on the market in such a way that the sum of achieved position plus open buy orders will not exceed 18,000 shares and the sum of achieved plus open sell orders will not fall below 12,000 shares. In that way, the activity of a plurality of agents on both sides of each constituent of a basket can be coordinated towards achieving a unique execution trajectory with set tolerance on relative rates of execution of the constituents.

Figure 27:
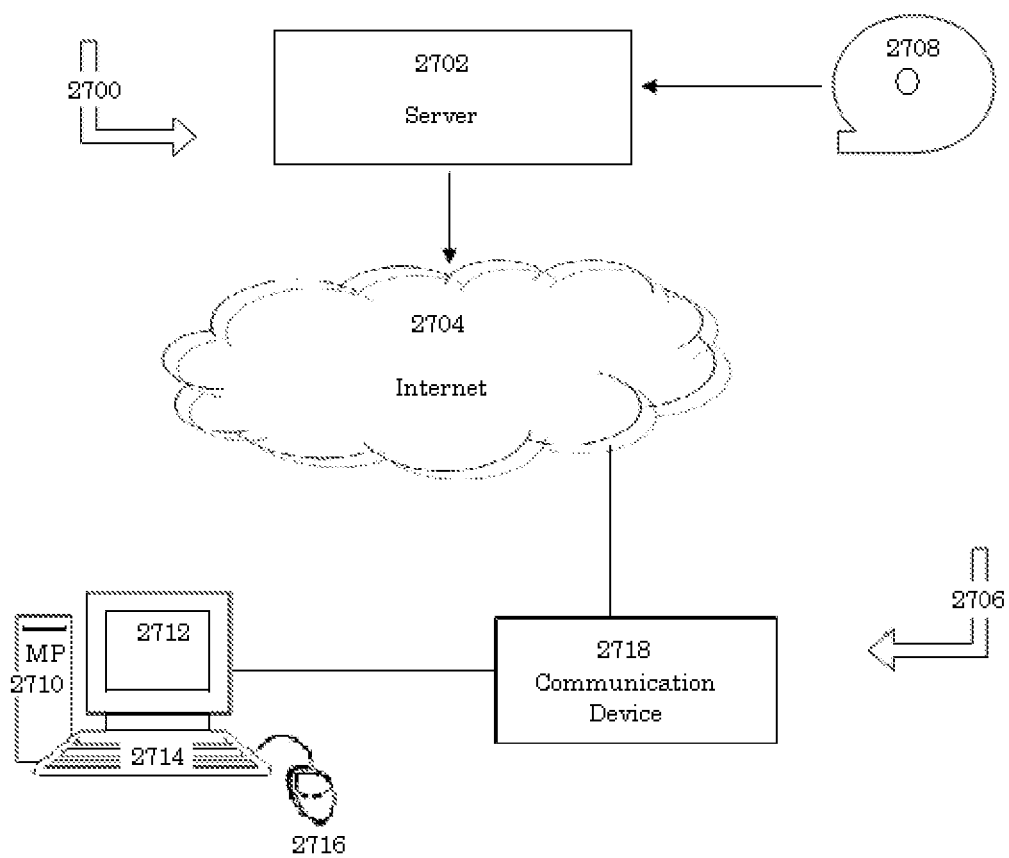
FIG. 27 is a block diagram showing a system on which the preferred embodiments can be implemented.

FIG. 27 shows a block diagram of a system 2700 on which any of the disclosed embodiments can be implemented. A server 2702 communicates over the Internet 2704, or another suitable communication medium, with a user's computer (or other device such as an Web-enabled cellular telephone) 2706. The software to implement any of the embodiments can be supplied on any suitable computer-readable medium 2708. The computer preferably includes a microprocessor 2710, a display 2712 for displaying the user interface described herein, input devices such as a keyboard 2714 and a mouse 2716, and a communication device 2718, such as a cable modem, for connecting to the Internet 2704.

An overview of the operation of the preferred embodiment will be set forth with reference to the flow chart of FIGS. 28A-28C2, which should be understood in relation to the disclosure given above. Rectangles represent user actions, while ellipses represent system actions.

Figure 28A:
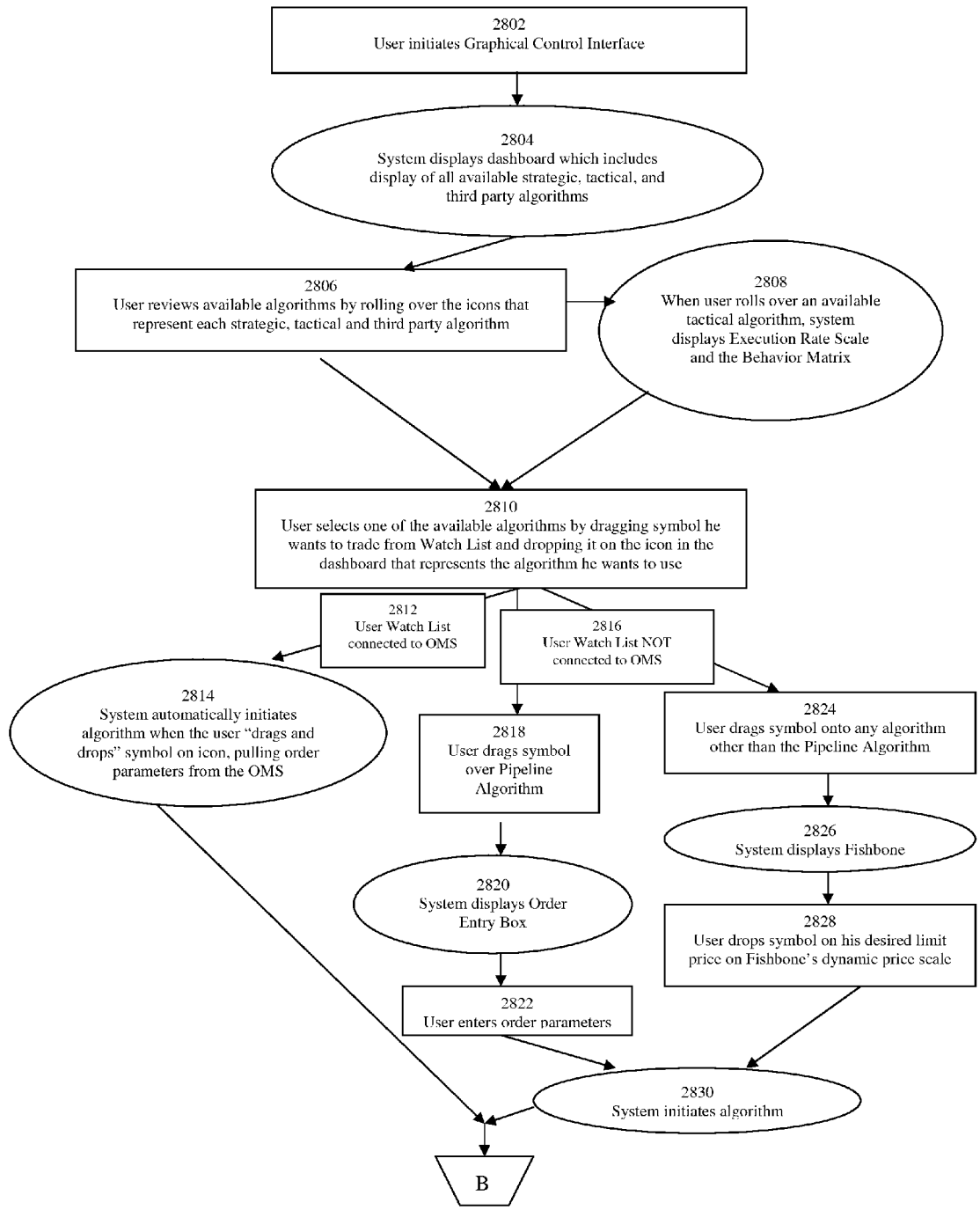

In FIG. 28A, step 2802, the user initiates the graphical control interface, which is then displayed to the trader. In step 2804, the system displays the dashboard, which includes a display of all available strategic, tactical and third-party algorithms. In step 2806, the user reviews the available algorithms by rolling over the icons which represent each strategic, tactical and third-party algorithm. When the user rolls over an available tactical algorithm, then, in step 2808, the system displays the execution rate scale and the behavior matrix. From either step 2806 or 2808, the user proceeds to step 2810, in which the user selects one of the available algorithms by dragging the symbol which the user wants to trade from the watch list and dropping it on the icon in the dashboard which represents the algorithm which the trader wants to use.

Figure 28B:
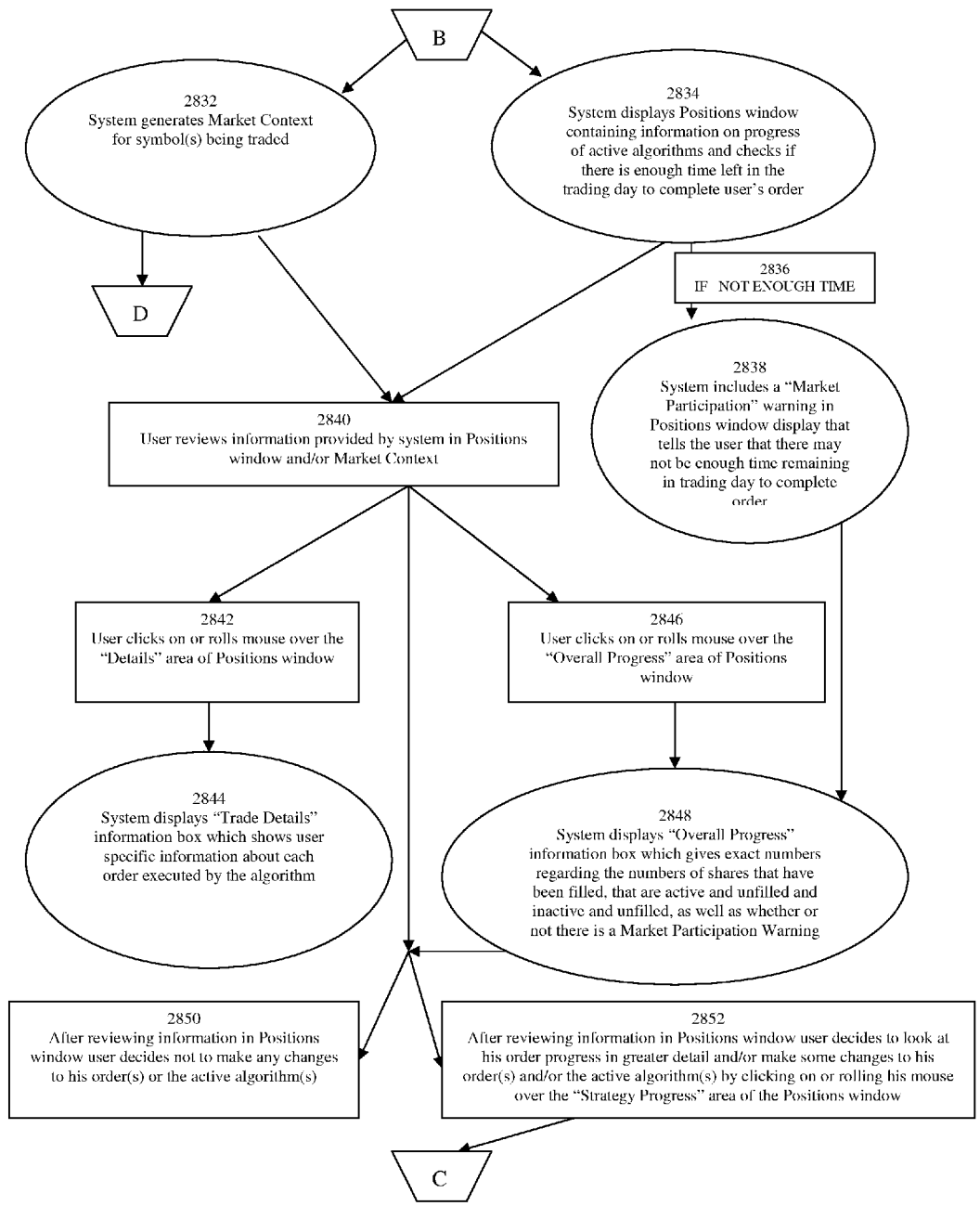
Figure 28C:
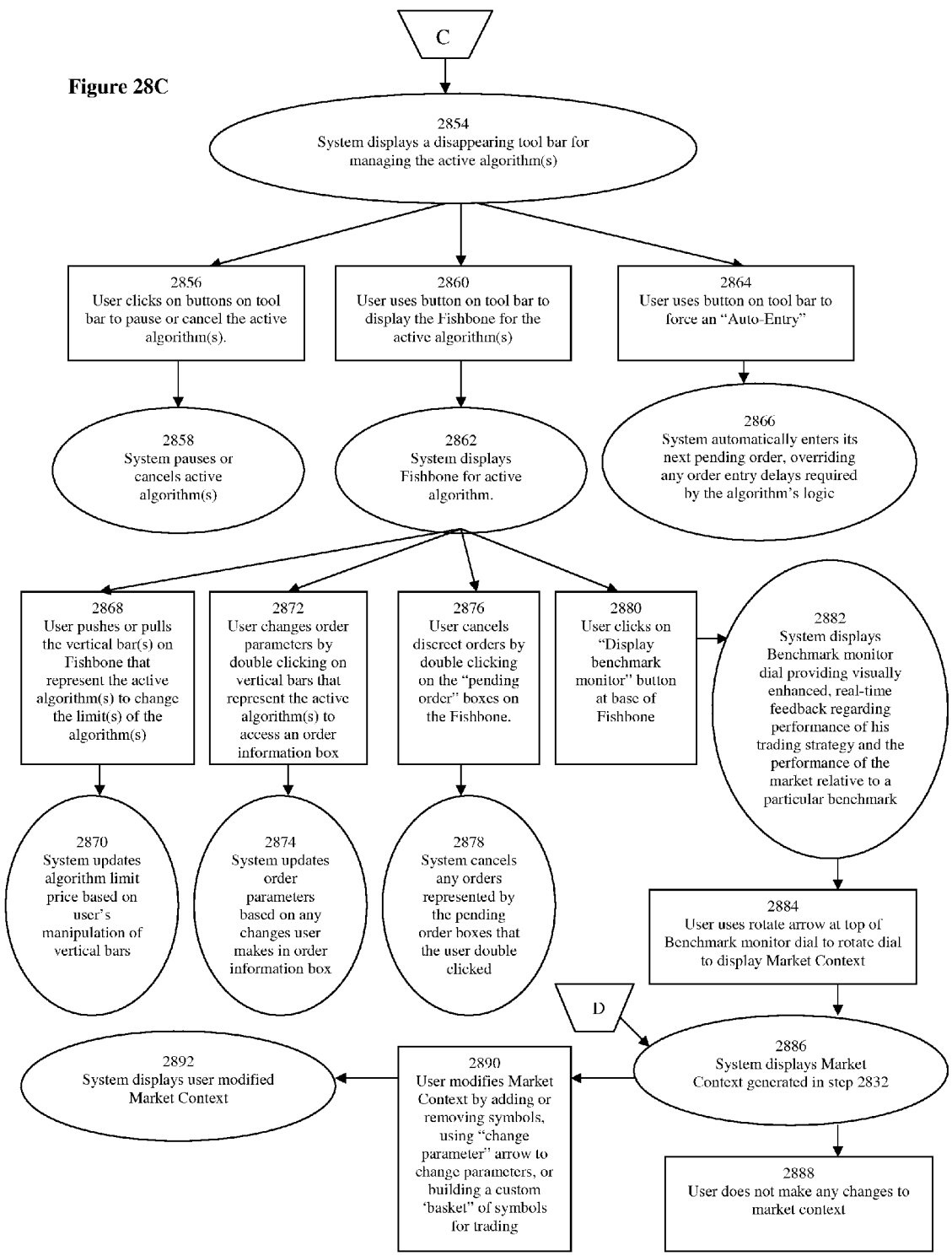

If it is determined in step 2812 that the user watch list is connected to the OMS, then, in step 2814, the system automatically initiates the algorithm when the user drags and drops the symbols onto the icon, pulling order parameters from the OMS. If it is determined in step 2816 that the user watch list is not connected to the OMS, then one of the following sequences of events occurs, based on the user's choice. If the user drags the symbol over the Pipeline algorithm in step 2818, then, in step 2820, the system displays the order entry box, and in step 2822, the user enters the order parameters. If the user drags the symbol onto any algorithm other than the Pipeline algorithm in step 2824, then, in step 2826, the system displays the fishbone, and, in step 2828, the user drops the symbol onto the desired limit price on the fishbone's dynamic price scale. Either way, the system initiates the algorithm in step 2830, and the overall process proceeds to FIG. 28B.

The system generates the market context for the symbol(s) being traded in step 2832 and/or, in step 2834, displays the positions window containing information on the progress of the active algorithms and checks to see whether there is enough time left in the trading day to complete the user's order. If it is determined in step 2836 that there is not enough time, then in step 2838, the system issues a "market participation" warning in the positions window display which tells the user that there may not be enough time remaining in the trading day to complete the order.

After step 2832, 2834 or (if applicable) 2838, the user reviews the information provided by the system in the positions window and/or the market context in step 2840.

The user can then click on or roll the mouse over the "Details" area of the positions window in step 2842. In step 2844, the system displays a "Trade Details" information box which shows user-specific information about each order generated by the algorithm. Alternatively, the user can click on or roll the mouse over the "Overall Progress" area of the Positions window in step 2846. In response to step 2846, the system displays an "overall progress" information box in step 2848, which gives exact numbers regarding the numbers of shares which have been filed, which are active and unfilled and which are inactive and unfilled, as well as whether or not there is a market participation warning (as determined in step 2838).

After step 2840, 2844 or 2848, the user can do either of the following. In step 2850, after reviewing the information in the positions window, the user can decide not to make any changes to the orders or the active algorithms. Alternatively, in step 2852, after reviewing the information in the positions window, the user can decide to look at the order progress in greater detail and/or make some changes to the orders and/or the active algorithms by clicking on or rolling the mouse over the "Strategy Progress" area of the positions window, whereupon the process proceeds to FIGS. 28C1 and 28C2.

In step 2854, the system displays a disappearing tool bar for managing the active algorithms. In response, the user can do one of three things. In step 2856, the user can click on the buttons in the tool bar to pause or cancel the active algorithm (s), whereupon the system pauses or cancels them in step 2858. In step 2860, the user can use the buttons in the tool bar to display the fishbone for the active algorithm(s), whereupon the system displays the fishbone in step 2862. In step 2864, the user can use the buttons on the tool bar to force an "auto-entry," whereupon, in step 2866, the system automatically enters its next pending order, overriding any order entry delays required by the algorithm's logic.

In response to step 2862, the user can do one of the following four things. In step 2868, the user can push or pull the vertical bar(s) on the fishbone which represent the active algorithm(s) to change the limit(s) of the algorithm(s), whereupon, in step 2870, the system updates the algorithm limit price based on the user's manipulation of the vertical bars. In step 2872, the user can change the order parameters by double clicking on the vertical bars which represent the active algorithm(s) to access an order information box, whereupon, in step 2874, the system updates the order parameters based on any changes which the user has made in the order information box. In step 2876, the user can cancel discreet orders by double clicking on the "pending order" boxes on the fishbone, whereupon, in step 2878, the system can cancel any orders represented by the pending order boxes which the user has double-clicked.

The fourth option is more involved. In step 2880, the user can click on the "display benchmark monitor" button at the base of the fishbone. In response, in step 2882, the system displays the benchmark monitor dial, providing visually enhanced, real-time feedback regarding the performance of the user's trading strategy and the performance of the market relative to a particular benchmark. In step 2884, the user uses the rotate arrow at the top of the benchmark monitor to rotate the dial to display the market context. In step 2886, the system displays the market context generated in step 2832.

The user can choose not to make any changes to the market context in step 2888. Alternatively, in step 2890, the user can modify the market context by adding or removing symbols, using the "change parameter" arrow to change the parameters, or building a custom basket of symbols for trading. In step 2892, the system displays the user-modified market context.

Figure 29:
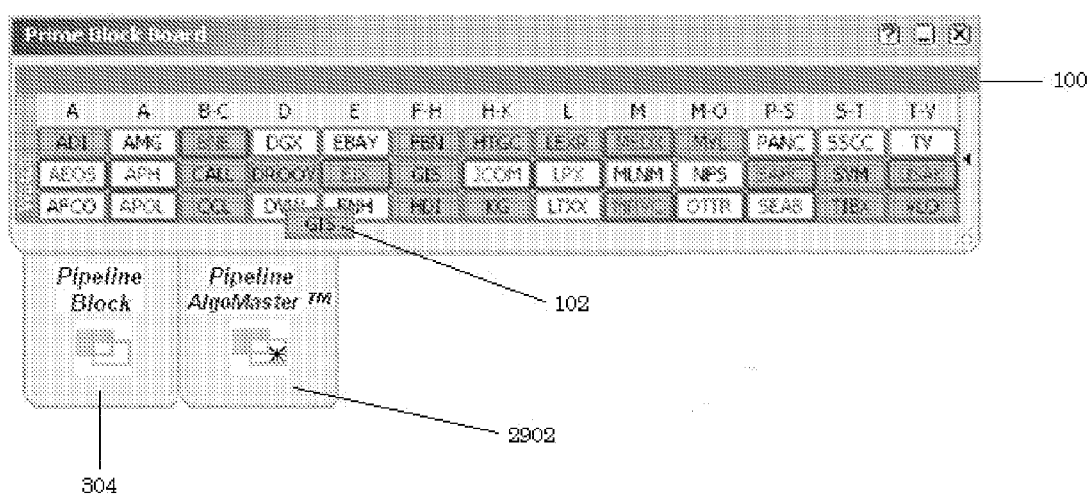
FIGS. 29-33 are screen shots showing a variation of the preferred embodiment in which the trader can control the speed of an algorithm.

Another variation of the preferred embodiment will be set forth in detail with reference to FIGS. 29-33. As shown in FIG. 29, the trader clicks and drags a symbol onto the Pipeline Block icon 304 or action icons in a toolbar to participate in the market. The trader can configure an optional delay to start participating with trader settings dialog. The following action icons appear when scrolling over the AlgoMaster icon 2902: The Pipeline Block 304 places a block order on Pipeline, and the Pipeline AlgoMaster 2902 places a block order on Pipeline and simultaneously accesses the market using algorithms. Additional icons can be provided to bring up news wires or technical charts via strategic partnerships.

Figure 30:
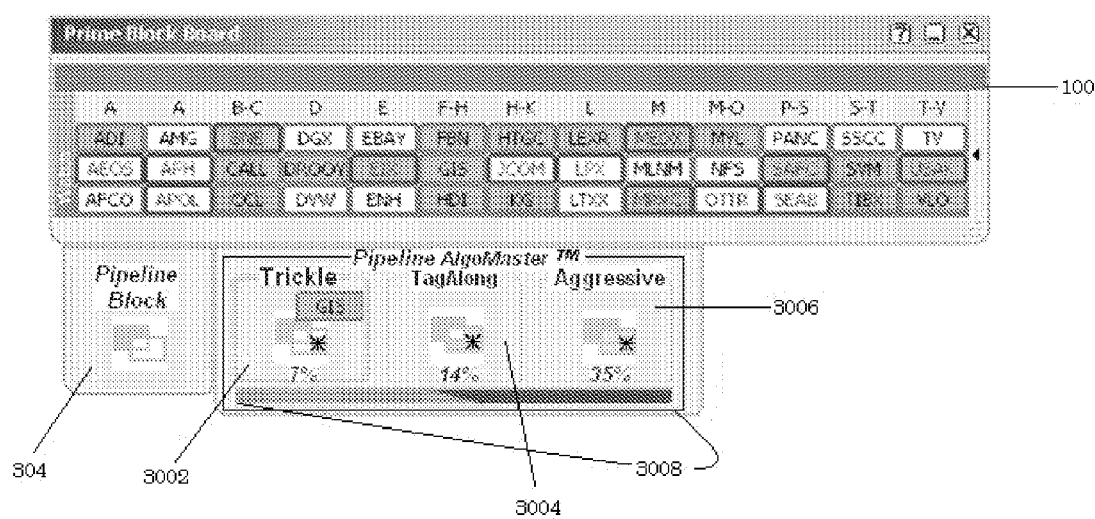

FIG. 30 shows the operation of dropping on an icon to launch Pipeline+Algorithms. Three speed settings are based on the current "red-line rate" (as defined in paragraph 0057)

for the stock. Red-line values are available if symbol is on the BPR watch list. "Trickle" 3002 indicates Pipeline+best tactic for low-market impact routing (3-10%). "TagAlong" 3004 indicates Pipeline+market participation as fast as we can go without becoming the "axe". Expect 10-30% depending on market conditions "Aggressive" 3006 takes 30-60% of the market until half the order is done or substantial resistance is encountered, then alternates with "tag along" methods to allow price to find an equilibrium but averaging at least 20% of the market. A red-line bar 3008 shows the red-line rate; of course, other indicators could be used as well, such as a car tachometer.

Figure 31:
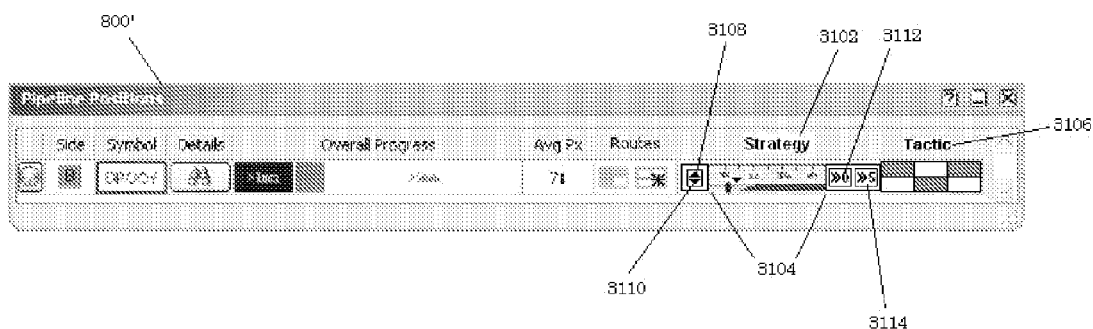

Referring to FIG. 31, in a modified Pipeline Positions bar 800', the Strategy graphic 3102 shows a market color (red-line) graphic 3104 similar to the red-line bar 3008 just described. The trader can click on the Pipeline route icon to see an alternative display showing a Bollinger band/XVA graphic and Pipeline-specific controls. The switching action is visible on the Market Color graphic (Tactic) 3106. Automatic algorithm switching minimizes information leaks by cutting out some of six possible actions (such as "Peg", or "Take", . . . ). The interface provides trader controls to switch up/down in speed, such as the up/down arrow buttons 3108 and 3110, and Fast Forward buttons to launch very aggressive trading (smart sweep) to the offer (bid) (button 3112) or up (down) 5 cents (button 3114). The trader can right-click to change number of cents, as explained below, or save other default in trader configuration.

Figure 32:
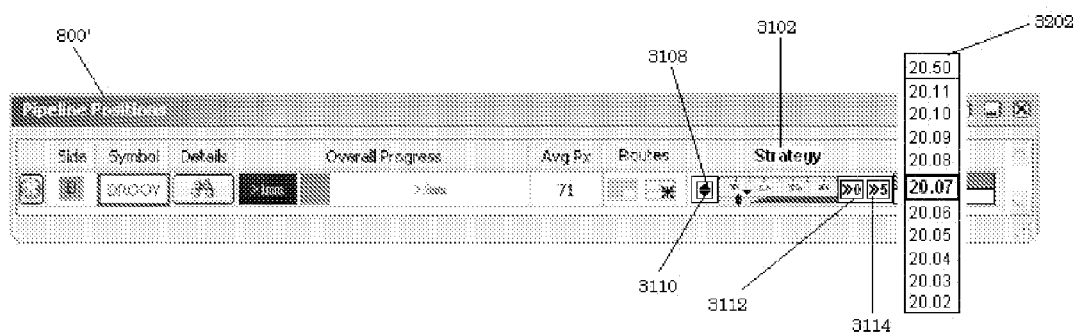

As shown in FIG. 32, the trader can use a fast-forward limit price override using a drag and drop paradigm. The default limit is 5 cents (configurable) from NBBO. The trader can right-click to change the number of cents; in one example, a pick list 3202 appears. The limit price graphic will remain steady; market prices may fluctuate. The price scale can change with price (e.g., ticks should be 2 cents for PG, 5 cents for GOOG). The fast-forward button graphic toggles to simple forward to revert back to normal mode or when the offer is above the limit.

Figure 33:
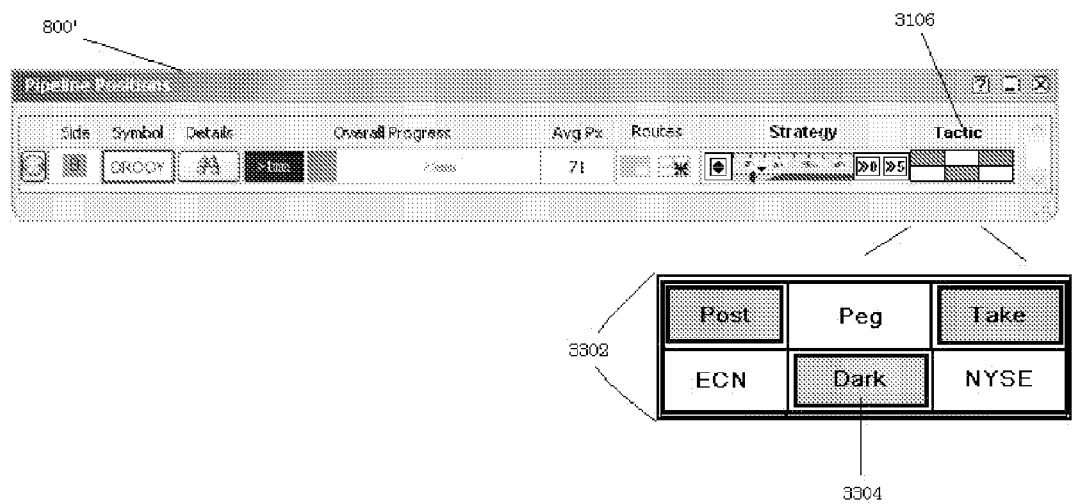

As shown in FIG. 33, a mouse scroll over the market color graphic reveals the meaning of the tactic display in a display 3302. On switching, the elements switched off show a red outline 3304 for 5 seconds, and new elements are shared green. The interface uses color rather than gray to convey that this is market color. In other embodiments, the colors can convey additional information, such as the market response to the algorithm's orders. This can be defined as a flag where "sensitive" indicates a stronger-than-average response, "normal" is average and "two-sided" indicates an increase in counter-party activity or a decrease in competition. Alternatively the market response can be measured as the ratio of the aggregate third-party order size triggered by the algorithm's orders to the algorithm's own aggregate order size; for example a response factor of 50% means that every 1000 shares placed by the algorithm prompts other market participants to either place an additional 500 shares on the same side or cancel 500 shares on the contra side. Of course, both the use of color rather than grayscale and the specific colors used are illustrative rather than limiting.

While preferred and alternative embodiments have been set forth above, those skilled in the art who have reviewed the present disclosure will readily appreciate that other embodiments can be realized within the scope of the present invention. Some possible variations have been disclosed above. Also, features of the embodiments that have been disclosed separately can be used together, while those disclosed together can be used separately. In particular, all or only some of the disclosed functionality can be used in any given embodiment. Therefore, the present invention should be construed as limited only by the appended claims.

APPENDIX

An Empirical Study of Resistance and Support on Liquidity Dynamics

The purpose of this empirical study is twofold. Firstly, we examine whether there is evidence of liquidity clustering around reference price levels. In a second step, we test whether the predictors similar to those of liquidity also determine price direction. The bulk of the existing literature on trade clustering focuses on how trades tend to gather around prices that are round numbers (Osborne, Niederhoffer, Harris) or psychological barriers (Sonnemans, Donaldson and Kim). Sonnemans develops an empirical strategy to test between the odd price hypothesis, according to which humans attribute more weight to the first digit of each number, and the alternative hypothesis that investors have target prices for their holdings. His findings suggest that prices can indeed turn into psychological references to the traders and act as resistance and support levels. Donaldson and Kim find evidence that price levels at multiples of 100 are psychological barriers to the Dow Jones Industrial Average and act, at least temporarily, as support and resistance levels.

This study focuses on intraday fluctuations in liquidity as measured by the number of shares traded required to push a stock through a certain price level. Resistance and support levels are not asymptotic prices at which trigger strategists buy or sell a stock (as in Krugman) but, instead, prices that can be crossed, although perhaps with more difficulty, if the number of shares is large enough to push the price through such levels (as in Donaldson and Kim or Bertola and Caballero). The proposed estimation model of liquidity dynamics is a more general one than those found in existing literature since, for each price level, we consider major prior events and associated quantities as potential determinants of accumulation of liquidity. Resistance and support levels, in which an unusual amount of liquidity is available on one side of the market, are a particular case of historical price levels under consideration.

After proposing a set of potential key predictive drivers of liquidity at each price level, we fit empirical models explaining its fluctuations in order to estimate the impact and test the significance of each individual predictor.

Data and Methods:

We analyze market data for the period between Dec. 18 and Dec. 28, 2006, excluding after-hours trading due to the lower liquidity levels and frequency of trades at that time. For these same reasons, and to assure a fairly homogenous set of tickers where liquidity dynamics is more likely to occur, we restricted the universe of stocks to those with an average volume-weighted price over 1 dollar and an average daily number of executed shares over 400,000. The resulting subset includes 1,519 stocks over 8 trading days.

With the premise that the higher the volatility of a stock, the more likely it is for two consecutive prices levels to be treated as the same, we cross-grain market data into buckets that include all prints within a price interval defined by the mean and variance of the spread of each stock.

We excluded from the analysis all odd single prints (n) that were out of line with adjacent prints i.e.

$$|P_n - P_{n-1}| > (\text{spread} + \text{std}) \text{ AND } |P_{n+1} - P_{n-1}| < (\text{spread} + \text{std}) \quad (1)$$

where spread is the average difference between the prices of two subsequent prints and std is its standard deviation. For first and last prints in the day, the exclusion criteria are, respectively, $|P_n - P_{n+1}| > (\text{spread}+\text{std})$ and $$|P_n - P_{n-1}| > (\text{spread}+\text{std})$$

After filtering, we take the first print of each symbol on each trading day and include in its bucket all subsequent prints n that satisfy the condition:

$$n \in \text{bucket}: |\text{Max}\{P_n\} - \text{Min}\{P_n\}| <= (\text{spread}+\text{std}) \quad (2)$$

Every time a print does not satisfy condition (2) a new bucket is started. All buckets are classified according to the price movement of the print that initiated it i.e. a bucket is classified as an uptick (U) when it is started with a price increase, otherwise it is classified as a downtick (D). We then classify each bucket as a type of event according to its tick and that of the subsequent bucket: If the bucket's price is an uptick and the last price change was also an uptick then we classify the event as a double-uptick. Likewise, a downtick that follows a downtick is classified a double-downtick. When price changes direction from an uptick to a downtick it is classified as a resistance level or, in the reverse case, as a support level.

The empirical implementation involves the pooling of all stocks for model fitting, which requires the preliminary step of correcting for the heterogeneity of stocks. For this purpose, instead of looking at the absolute value of number of shares executed, we consider instead the adjusted volume in each bucket by taking its ratio to the average traded volume in each symbol in each trading day. Table 1 displays the frequency of each type of event as well and the number of executed shares at each event in absolute value (quantity), relatively to the average volume of the stock on each specific date (q/qavg) and in logarithms of the relative value to the average (Log(q/qavg)).

In our sample, price movements are more likely to change direction from one bucket to another than to persist. When price movements persist, the number of executed shares is higher on average that at turning points. This finding is consistent with the fact that turning points reflect one-sided liquidity that was not exhausted, whereas double upticks and downticks are persistent price movements driven by a higher than average number of executed shares. Our estimation models explore this evidence more thoroughly by looking at the fluctuations in volume within each type of event and testing its correlation with prior clustering at a similar price.

TABLE 1

Type of Event and Executed Shares

| | Freq | Quantity | Q/Qavg | Log(Q/Qavg) |
|---|---|---|---|---|
| U | 23% | 10,678 | 1.085 | −0.561 |
| D | 23% | 10,698 | 1.065 | −0.583 |
| R | 27% | 9,602 | 0.948 | −0.761 |
| S | 27% | 9,072 | 0.906 | −0.804 |

In the empirical specification, we hypothesize that volume traded in each bucket may be affected by the immediately preceding event and respective volume and events and quantity traded at similar historical price levels. In an analogous process to the construction of bins, we consider two prices to be similar when the absolute difference between the two is smaller than the spread plus its standard deviation. The proposed set of determinants includes the following variables:

Event type of the prior bucket: $E_{t-1}$ (S) where $S \in \{U, D, R, S\}$ is an indicator variable for double uptick, double downtick, resistance and support, respectively. For example, $E_{t-1}(U)$ is equal to 1 if event type was a double uptick and equal to 0 otherwise.

Quantity traded in the preceding bucket interacted with respective event type $Q \times E_{t-1}$ (S) where $S \in \{U, D, R, S\}$. This term allows quantity traded in immediately prior event to have a different impact on current number of shares traded depending on whether that event was a double uptick, a double downtick, a resistance or a support level.

Event type around latest price similar to current price $E_{price}$ (S), where $S \in \{U, D, R, S\}$. $E_{price}(U)$ is equal to 1 if event was a double uptick and equal to 0 otherwise. In reference case, current price has not been visited in the past 24 hours.

Interaction of the quantity traded in latest bucket around current price with associated event type $Q \times E_{price}(S)$, where $S \in \{U, D, R, S\}$.

Whether it is the case that there is an extraordinary number of shares traded around current price at any instance within the prior 24 hours (BigQ). We consider volume to be extraordinarily high if quantity is strictly larger than two times the average for that symbol that day. The indicator variable of very high volume around current price is interacted with an indicator variable for event type of latest instance. (BigQxE) $S \in \{U, D, R, S\}$. Big-QxE(U) is strictly positive if it is the case that current price has been visited within the prior 24 hours and the latest instance of that type of event was a double tick.

Whether current price is in the neighborhood of the maximum or minimum volume-weighted prices of the prior trading day buckets. Max and Min are indicator variables for each case.

Whether current price is in the neighborhood of the first and last volume-weighted price of the prior trading day buckets. Open and Close are indicator variables for each case.

Whether current price is in the neighborhood of the whole dollar or 50 cents. Dollar and Halves are indicator variables for each respective case.

Table 2 displays either the mean of each proposed variable by type of event, which for indicator variables corresponds to the frequency of the event in question.

TABLE 2

Table of means by type of event

| | U | D | R | S |
|---|---|---|---|---|
| E t-1 (U) | −0.332 | — | 0.438 | — |
| E t-1 (D) | — | 0.485 | — | 0.441 |
| E t-1 (R) | — | 0.51 | — | 0.55 |
| E t-1 (S) | −0.373 | — | 0.553 | — |
| Q * E t-1 (U) | −0.332 | — | −0.329 | — |
| Q * E t-1 (D) | — | −0.317 | — | 0.441 |
| Q * E t-1 (R) | — | −0.376 | −0.428 | 0.55 |
| Q * E t-1 (S) | −0.373 | — | — | — |
| E price (U) | 0.143 | 0.187 | 0.135 | 0.168 |
| E price (D) | 0.189 | 0.145 | 0.171 | 0.137 |
| E price (R) | 0.33 | 0.299 | 0.374 | 0.281 |
| E price (S) | 0.297 | 0.324 | 0.281 | 0.374 |
| Q × E price (U) | −0.097 | −0.109 | −0.096 | −0.103 |
| Q × E price (D) | −0.116 | −0.102 | −0.11 | −0.101 |
| Q × E price (R) | −0.262 | −0.221 | −0.321 | 0.225 |
| Q × E price (S) | −0.236 | −0.266 | −0.238 | −0.338 |
| BigQ * E (U) | 0.179 | 0.184 | 0.178 | 0.18 |
| BigQ * E (D) | 0.179 | 1.174 | 0.174 | 0.172 |
| BigQ * E (R) | 0.173 | 0.171 | 0.184 | 0.175 |
| BigQ * E (S) | 0.157 | 0.158 | 0.161 | 0.17 |
| Open | 0.023 | 0.023 | 0.024 | 0.024 |
| Close | 0.035 | 0.036 | 0.037 | 0.036 |
| Max | 0.018 | 0.019 | 0.02 | 0.019 |

TABLE 2-continued

Table of means by type of event

|  | U | D | R | S |
|---|---|---|---|---|
| Min | 0.035 | 0.035 | 0.035 | 0.035 |
| Dollar | 0.075 | 0.075 | 0.078 | 0.079 |
| Halves | 0.146 | 0.146 | 0.149 | 0.15 |

The proposed set of explanatory variables of volume traded is included in a linear regression, predicting number of shares traded relatively to the average that day for that symbol. For each specific event, only two immediately prior events are possible: a for example double uptick can only be preceded by another double uptick or a support. For this reason, only one indicator variable for lagged event is defined when a constant is included in the model. As for interaction with associated quantity, only two lagged indicator variables can be identified.

In the linear estimation model we calculate the Huber/White "sandwich" estimators of variance, which are robust in the sense that they give accurate assessments of the sample-to-sample variability of the parameter estimates even when the model is misspecified in several instances, such as when there are minor problems about normality, heteroscedasticity, or some observations that exhibit large residuals.

Results: Table 1 displays results of the least squares estimation. The findings indicate that almost all proposed variables have a statistically significant effect on volume traded. Quantity traded in the previous bucket, as well as quantity traded in the preceding bucket around current price, have a significant positive effect on volume. There is also a significantly higher quantity traded in the cases where there was a prior major clustering of volume around the current price.

Although proximity to resistance or support price levels has a negative impact on quantity traded, when a resistance or support price level is revisited, volume is significantly higher. Furthermore, the larger the prior volume traded at a turning point around a certain price, the bigger the impact on volume in a subsequent event around that price.

The fraction of times the current price has been revisited as a turning point (over the total number of events around that price) has a very different impact on current volume depending on whether the current event is a double tick or a turning point. Volume is lower when price is revisited in a turning point, but is much higher when price is passed on a double tick.

Surprisingly, volume traded around the reference prices of the prior trading day is higher in the cases where there is a change of price direction, but not when current event is a double tick.

TABLE 2

Linear Regression. Explained variable: Log [Q/avg(Q)]

|  | (1) U | | (2) U | |
|---|---|---|---|---|
|  | Coeff. | SE | Coeff. | SE |
| E t-1 (U) | — | — | — | — |
| E t-1 (D) | — | — | — | — |
| E t-1 (R) | — | — | — | — |
| E t-1 (S) | −0.033 | 0.008 | −0.138 | 0.004 |
| Q × E t-1 (U) | −0.156 | 0.018 | 0.201 | 0.002 |
| Q × E t-1 (D) | — | — | — | — |
| Q × E t-1 (R) | — | — | — | — |
| Q × E t-1 (S) | −0.106 | 0.018 | 0.255 | 0.022 |

TABLE 2-continued

Linear Regression. Explained variable: Log [Q/avg(Q)]

|  | (1) U | | (2) U | |
|---|---|---|---|---|
|  | Coeff. | SE | Coeff. | SE |
| E price (U) | 0.546 | 0.065 | — | — |
| E price (D) | 0.58 | 0.065 | — | — |
| E price (R) | 0.478 | 0.065 | — | — |
| E price (S) | 0.65 | 0.065 | — | — |
| Q × E price (U) | 0.314 | 0.018 | — | — |
| Q × E price (D) | 0.312 | 0.018 | — | — |
| Q × E price (R) | 0.382 | 0.018 | — | — |
| Q × E price (S) | 0.389 | 0.018 | — | — |
| BigQ × E (U) | 0.144 | 0.005 | 0.145 | 0.005 |
| BigQ × E (D) | 0.157 | 0.005 | 0.153 | 0.005 |
| BigQ × E (R) | 0.191 | 0.005 | 0.193 | 0.005 |
| BigQ × E (S) | 0.212 | 0.006 | 0.228 | 0.005 |
| Open | −0.035 | 0.012 | −0.035 | 0.012 |
| Close | −0.036 | 0.009 | −0.04 | 0.009 |
| Max | 0.033 | 0.013 | 0.034 | 0.013 |
| Min | −0.056 | 0.01 | −0.058 | 0.01 |
| Dollar | 0.058 | 0.009 | 0.057 | 0.009 |
| Halves | 0.064 | 0.007 | 0.064 | 0.007 |
| Constant | −1.075 | 0.065 | −0.467 | 0.004 |
| R2 | 0.08 | | 0.075 | |
| N | | 460,004 | | |

Note 1:
Coeff. is point estimate and SE is standard error

Note 2:
gray-shaded estimates are not statistically significant at 5% significance level

TABLE 3

Linear Regression. Explained variable: Log [Q/avg(Q)]

|  | (1) D | | (2) D | |
|---|---|---|---|---|
|  | Coeff. | SE | Coeff. | SE |
| E t-1 (U) | — | — | — | — |
| E t-1 (D) | — | — | — | — |
| E t-1 (R) | −0.143 | 0.004 | −0.073 | 0.008 |
| E t-1 (S) | — | — | — | — |
| Q × E t-1 (U) | — | — | — | — |
| Q × E t-1 (D) | 0.198 | 0.002 | −0.188 | 0.018 |
| Q × E t-1 (R) | 0.25 | 0.002 | −0.148 | 0.019 |
| Q × E t-1 (S) | −0.106 | 0.018 | — | — |
| E price (U) | — | — | 0.46 | 0.065 |
| E price (D) | — | — | 0.454 | 0.065 |
| E price (R) | — | — | 0.54 | 0.065 |
| E price (S) | — | — | 0.418 | 0.065 |
| Q × E price (U) | — | — | 0.341 | 0.018 |
| Q × E price (D) | — | — | 0.345 | 0.018 |
| Q × E price (R) | — | — | 0.415 | 0.018 |
| Q × E price (S) | — | — | 0.423 | 0.018 |
| BigQ × E (U) | 0.157 | 0.005 | 0.158 | 0.005 |
| BigQ × E (D) | 0.15 | 0.005 | 0.172 | 0.005 |
| BigQ × E (R) | 0.226 | 0.005 | 0.433 | 0.015 |
| BigQ × E (S) | 0.203 | 0.006 | 0.589 | 0.06 |
| Open | −0.032 | 0.012 | −0.025 | 0.012 |
| Close | −0.055 | 0.009 | −0.047 | 0.009 |
| Max | −0.026 | 0.013 | −0.026 | 0.013 |
| Min | −0.033 | 0.009 | −0.019 | 0.009 |
| Dollar | 0.053 | 0.009 | 0.05 | 0.009 |
| Halves | 0.071 | 0.007 | 0.063 | 0.006 |
| Constant | −0.503 | 0.004 | −0.993 | 0.068 |
| R2 | 0.074 | | 0.078 | |
| N | | 458,883 | | |

Note 1:
Coeff. is point estimate and SE is standard error

Note 2:
gray-shaded estimates are not statistically significant at 5% significance level

TABLE 4

Linear Regression. Explained variable: Log[Q/avg(Q)]

| | (1) R | | (2) R | |
|---|---|---|---|---|
| | Coeff. | SE | Coeff. | SE |
| E t-1 (U) | — | — | — | — |
| E t-1 (D) | — | — | — | — |
| E t-1 (R) | — | — | — | — |
| E t-1 (S) | −0.033 | 0.008 | −0.203 | 0.004 |
| Q × E t-1 (U) | −0.156 | 0.018 | 0.216 | 0.002 |
| Q × E t-1 (D) | — | — | — | — |
| Q × E t-1 (R) | — | — | — | — |
| Q × E t-1 (S) | −0.106 | 0.018 | 0.275 | 0.002 |
| E price (U) | 0.546 | 0.065 | — | — |
| E price (D) | 0.58 | 0.065 | — | — |
| E price (R) | 0.478 | 0.065 | — | — |
| E price (S) | 0.65 | 0.065 | — | — |
| Q × E price (U) | 0.314 | 0.018 | — | — |
| Q × E price (D) | 0.312 | 0.018 | — | — |
| Q × E price (R) | 0.382 | 0.018 | — | — |
| Q × E price (S) | 0.389 | 0.018 | — | — |
| BigQ × E (U) | 0.144 | 0.005 | 0.156 | 0.005 |
| BigQ × E (D) | 0.157 | 0.005 | 0.171 | 0.005 |
| BigQ × E (R) | 0.191 | 0.005 | 0.208 | 0.005 |
| BigQ × E (S) | 0.212 | 0.006 | 0.247 | 0.005 |
| Open | −0.035 | 0.012 | 0.002 | 0.011 |
| Close | −0.036 | 0.009 | −0.031 | 0.009 |
| Max | 0.033 | 0.013 | 0.011 | 0.012 |
| Min | −0.056 | 0.01 | −0.03 | 0.009 |
| Dollar | 0.058 | 0.009 | 0.045 | 0.008 |
| Halves | 0.064 | 0.007 | 0.069 | 0.006 |
| Constant | −1.156 | 0.06 | −0.614 | 0.004 |
| R2 | 0.092 | | 0.086 | |
| N | | 539,399 | | |

Note 1:
Coeff. is point estimate and SE is standard error
Note 2:
gray-shaded estimates are not statistically significant at 5% significance level

TABLE 5

Linear Regression. Explained variable: Log[Q/avg(Q)]

| | (1) S | | (2) S | |
|---|---|---|---|---|
| | Coeff. | SE | Coeff. | SE |
| E t-1 (U) | — | — | — | — |
| E t-1 (D) | — | — | — | — |
| E t-1 (R) | −0.225 | 0.004 | −0.073 | 0.008 |
| E t-1 (S) | — | — | — | — |
| Q × E t-1 (U) | — | — | — | — |
| Q × E t-1 (D) | 0.215 | 0.002 | −0.188 | 0.015 |
| Q × E t-1 (R) | 0.274 | 0.002 | −0.148 | 0.015 |
| Q × E t-1 (S) | — | — | — | — |
| E price (U) | — | — | 0.52 | 0.064 |
| E price (D) | — | — | 0.471 | 0.064 |
| E price (R) | — | — | 0.582 | 0.064 |
| E price (S) | — | — | 0.47 | 0.063 |
| Q × E price (U) | — | — | 0.359 | 0.015 |
| Q × E price (D) | — | — | 0.365 | 0.015 |
| Q × E price (R) | — | — | 0.437 | 0.015 |
| Q × E price (S) | — | — | 0.457 | 0.015 |
| BigQ × E (U) | 0.17 | 0.005 | 0.173 | 0.005 |
| BigQ × E (D) | 0.147 | 0.005 | 0.151 | 0.005 |
| BigQ × E (R) | 0.23 | 0.005 | 0.216 | 0.005 |
| BigQ × E (S) | 0.204 | 0.005 | 0.195 | 0.005 |
| Open | −0.029 | 0.011 | −0.028 | 0.011 |
| Close | −0.039 | 0.009 | −0.036 | 0.009 |
| Max | −0.003 | 0.012 | −0.002 | 0.012 |
| Min | −0.023 | 0.009 | −0.022 | 0.009 |
| Dollar | 0.048 | 0.009 | 0.048 | 0.008 |
| Halves | 0.082 | 0.006 | 0.082 | 0.006 |
| Constant | −0.641 | 0.004 | −1.182 | 0.064 |
| R2 | 0.089 | | 0.095 | |
| N | | 536,466 | | |

Note 1:
Coeff. is point estimate and SE is standard error
Note 2:
gray-shaded estimates are not statistically significant at 5% significance level

TABLE 6

Linear Regression. Explained variable: Log [Q/avg(Q)]

| | (1) U/R | | (2) U/R | |
|---|---|---|---|---|
| | Coeff. | SE | Coeff. | SE |
| E t-1 (U) | — | — | — | — |
| E t-1 (D) | — | — | — | — |
| E t-1 (R) | — | — | — | — |
| E t-1 (S) | 0.008 | 0.007 | −0.062 | 0.004 |
| Q × E t-1 (U) | −0.119 | 0.016 | 0.182 | 0.002 |
| Q × E t-1 (D) | — | — | — | — |
| Q × E t-1 (R) | — | — | — | — |
| Q × E t-1 (S) | −0.058 | 0.016 | 0.235 | 0.002 |
| E price (U) | 0.479 | 0.059 | — | — |
| E price (D) | 0.511 | 0.059 | — | — |
| E price (R) | 0.487 | 0.059 | — | — |
| E price (S) | 0.602 | 0.059 | — | — |
| Q × E price (U) | 0.314 | 0.016 | — | — |
| Q × E price (D) | 0.312 | 0.016 | — | — |
| Q × E price (R) | 0.382 | 0.016 | — | — |
| Q × E price (S) | 0.389 | 0.016 | — | — |
| BigQ × E (U) | 0.166 | 0.005 | 0.164 | 0.005 |
| BigQ × E (D) | 0.184 | 0.005 | 0.179 | 0.005 |
| BigQ × E (R) | 0.253 | 0.005 | 0.261 | 0.005 |
| BigQ × E (S) | 0.26 | 0.005 | 0.279 | 0.005 |
| Open | 0.005 | 0.011 | −0.003 | 0.011 |
| Close | −0.018 | 0.009 | −0.023 | 0.009 |
| Max | 0.07 | 0.012 | 0.07 | 0.013 |
| Min | −0.034 | 0.009 | −0.037 | 0.009 |
| Dollar | 0.081 | 0.009 | 0.081 | 0.009 |
| Halves | 0.063 | 0.006 | 0.064 | 0.006 |
| Constant | −0.303 | 0.059 | 0.252 | 0.004 |
| N | | 999,403 | | |

Note 1:
Coeff. is point estimate and SE is standard error
Note 2:
gray-shaded estimates are not statistically significant at 5% significance level The results from the estimation of the quantile regressions for the $80^{th}$ percentile are shown in Table 2. The evidence suggests that large accumulation of volume is predicted in a very similar way to average quantity. All point estimates are higher than those obtained from the least squares regression, except for the proportion of turning points around the current price. These findings imply that the 80th quartile of volume is, as expected, higher than the average and more affected by each predictor than the average. Nonetheless, the qualitative findings are virtually the same.

TABLE 7

Linear Regression. Explained variable: Log [Q/avg(Q)]

|  | (1) D/S | | (2) D/S | |
|---|---|---|---|---|
|  | Coeff. | SE | Coeff. | SE |
| E t-1 (U) | — | — | — | — |
| E t-1 (D) | — | — | — | — |
| E t-1 (R) | −0.077 | 0.004 | −0.055 | 0.007 |
| E t-1 (S) | — | — | — | — |
| Q × E t-1 (U) | — | — | — | — |
| Q × E t-1 (D) | 0.183 | 0.002 | −0.118 | 0.016 |
| Q × E t-1 (R) | 0.225 | 0.002 | −0.079 | 0.016 |
| Q × E t-1 (S) | −0.058 | 0.016 | — | — |
| E price (U) | — | — | 0.468 | 0.06 |
| E price (D) | — | — | 0.468 | 0.06 |
| E price (R) | — | — | 0.557 | 0.06 |
| E price (S) | — | — | 0.512 | 0.065 |
| Q × E price (U) | — | — | 0.264 | 0.016 |
| Q × E price (D) | — | — | 0.268 | 0.016 |
| Q × E price (R) | — | — | 0.326 | 0.016 |
| Q × E price (S) | — | — | 0.323 | 0.016 |
| BigQ × E (U) | 0.175 | 0.005 | 0.182 | 0.005 |
| BigQ × E (D) | 0.151 | 0.005 | 0.154 | 0.005 |
| BigQ × E (R) | 0.265 | 0.005 | 0.248 | 0.005 |
| BigQ × E (S) | 0.259 | 0.005 | 0.246 | 0.005 |
| Open | −0.009 | 0.011 | −0.008 | 0.011 |
| Close | −0.044 | 0.009 | −0.041 | 0.009 |
| Max | −0.012 | 0.012 | −0.012 | 0.012 |
| Min | −0.02 | 0.009 | −0.019 | 0.009 |
| Dollar | 0.075 | 0.009 | 0.074 | 0.009 |
| Halves | 0.077 | 0.006 | 0.077 | 0.006 |
| Constant | 0.225 | 0.004 | −0.29 | 0.06 |
| N | | | 995,349 | |

Note 1:
Coeff. is point estimate and SE is standard error

Note 2:
gray-shaded estimates are not statistically significant at 5% significance level

TABLE 8

Logistic Regression Explained: P[Reverse]

|  | (1) U/R | | (2) D/S | |
|---|---|---|---|---|
|  | Coeff. | SE | Coeff. | SE |
| Q t-1 | 1.035 | 0.046 | −1.024 | 0.043 |
| Change | 1.053 | 0.006 | 1.062 | 0.006 |
| E price (U) | 2.596 | 0.188 | 0.811 | 0.057 |
| E price (D) | 0.949 | 0.068 | 2.196 | 0.156 |
| E price (R) | 1.432 | 0.107 | 1.058 | 0.075 |
| E price (S) | 1.252 | 0.09 | 1.287 | 0.095 |
| Q × E price (U) | 0.995 | 0.045 | 0.94 | 0.039 |
| Q × E price (D) | 0.924 | 0.041 | 0.987 | 0.042 |
| Q × E price (R) | 0.937 | 0.043 | 0.929 | 0.039 |
| Q × E price (R) | 0.926 | 0.041 | 0.957 | 0.041 |
| BigQ × E (U) | 1.016 | 0.007 | 1.001 | 0.006 |
| BigQ × E (D) | 1.023 | 0.006 | 0.996 | 0.007 |
| BigQ × E (R) | 1.102 | 0.007 | 1.081 | 0.007 |
| BigQ × E (S) | 1.106 | 0.007 | 1.095 | 0.007 |
| Open | 1.054 | 0.014 | 1.018 | 0.014 |
| Close | 1.014 | 0.011 | 1.022 | 0.011 |
| Max | 1.06 | 0.016 | 1.023 | 0.016 |
| Min | 1.009 | 0.011 | 1.004 | 0.011 |
| Dollar | 1.042 | 0.011 | 1.032 | 0.011 |
| Halves | 1.027 | 0.008 | 1.027 | 0.008 |
| N | 996,061 | | 992,719 | |
| R2 | 0.01 | | 0.01 | |

TABLE 9

Logistic Regression Explained: P[Reverse]

|  | (3) ALL | |
|---|---|---|
|  | Coeff. | SE |
| Up | 0.993 | 0.003 |
| Q t-1 | 1.028 | 0.031 |
| Pchange | 1.086 | 0.004 |
| E price (U) | 0.966 | 0.053 |
| E price (D) | 0.958 | 0.052 |
| E price (R) | 0.923 | 0.056 |
| E price (S) | 0.93 | 0.057 |
| Q × E price (U) | 0.966 | 0.029 |
| Q × E price (D) | 0.957 | 0.029 |
| Q × E price (R) | 0.923 | 0.028 |
| Q × E price (R) | 0.93 | 0.28 |
| BigQ × E (U) | 1.013 | 0.004 |
| BigQ × E (D) | 1.015 | 0.005 |
| BigQ × E (R) | 1.104 | 0.005 |
| BigQ × E (S) | 1.112 | 0.005 |
| Open | 1.032 | 0.01 |
| Close | 1.006 | 0.008 |
| Max | 1.04 | 0.011 |
| Min | 1 | 0.008 |
| Dollar | 1.04 | 0.008 |
| Halves | 1.028 | 0.008 |
| N | 1,997,208 | |
| R2 | 0.002 | |

Our findings suggest that a change in direction around a price level is a significant predictor of subsequent volume traded at that same price. Specifically, a resistance (support) price might be an indicator of a significant amount of liquidity on the supply (demand) side. If the subsequent event also results in a change of direction, we can infer that the opposite side of the market did not exhaust the liquidity available. Our estimates are certainly consistent with this hypothesis since the volume traded at this point is either the same or lower than that observed in events occurring at prices that were not identified either as resistance or support. In the case that the subsequent event results in price changes in the same direction, we can infer that the liquidity available on the supply (demand) side was exhausted, which implies that the volume traded was unusually large. Both our specifications support this finding.

We claim:

1. A computer system comprising one or more processors programmed to:
   (a) receive data describing a trading order;
   (b) select one or more first trading algorithms from a plurality of available stored algorithms for execution of said trading order;
   (c) commence execution of said trading order via said one or more first trading algorithms;
   (d) evaluate quality of execution, during said execution, of said trading order via said one or more first trading algorithms;
   (e) compare said evaluated quality of execution to a threshold of acceptability based on a prediction of future performance of execution of said trading order by said one or more first trading algorithms; and
   (f) if said evaluated quality of execution compares unfavorably to said threshold of acceptability, switch said execution of said trading order to one or more second trading algorithms.

2. A computer system as in claim 1, wherein said selection of said one or more first trading algorithms is based on predictive modeling and existing market conditions.

3. A computer system as in claim 1, wherein said quality of execution is evaluated based on a comparison of at least one expected rate of execution and at least one actual rate of execution.

4. A computer system as in claim 3, wherein said at least one expected rate of execution is determined using one or more predictive models.

5. A computer system as in claim 1, wherein said quality of execution is evaluated in real-time.

6. A computer system as in claim 3, wherein said threshold of acceptability is proportional to one standard deviation below said expected rate of execution.

7. A computer system as in claim 1, wherein said switching occurs prior to quality of execution of said one or more first trading algorithms crossing said threshold of acceptability.

8. A computer system as in claim 3, wherein determining rate of execution comprises determining number of shares executed by an algorithm during a time interval, divided by total shares executed on a market during the time interval.

9. A computer system as in claim 3, wherein determining rate of execution comprises calculation of an exponentially-decayed moving average.

10. A computer system as in claim 1, wherein said threshold of acceptability is based in part on likelihood of low execution rate by said one or more first trading algorithms.

11. A computer system as in claim 1, wherein said one or more initial trading algorithms comprise a plurality of initial trading algorithms, and wherein said threshold of acceptability is based on an aggregate position goal.

12. A computer system as in claim 11, wherein said one or more processors are programmed to coordinate said plurality of initial trading algorithms based at least on tracking open orders.

13. A computer system as in claim 11, wherein said one or more processors are programmed to coordinate said plurality of initial trading algorithms based at least on said aggregate position goal.

14. A computer system as in claim 11, wherein said one or more processors are programmed to coordinate said plurality of initial trading algorithms based at least on limiting size of new orders placed on a market such that a sum of achieved position plus new orders does not exceed said aggregate position goal.

* * * * *